US008182142B2

(12) United States Patent
Abe et al.

(10) Patent No.: US 8,182,142 B2
(45) Date of Patent: May 22, 2012

(54) TEMPERATURE MEASURING APPARATUS AND TEMPERATURE MEASURING METHOD

(75) Inventors: Jun Abe, Nirasaki (JP); Tatsuo Matsudo, Nirasaki (JP); Chishio Koshimizu, Nirasaki (JP)

(73) Assignee: Tokyo Electron Limited, Tokyo (JP)

(*) Notice: Subject to any disclaimer, the term of this patent is extended or adjusted under 35 U.S.C. 154(b) by 949 days.

(21) Appl. No.: 12/043,654

(22) Filed: Mar. 6, 2008

(65) Prior Publication Data

US 2008/0304543 A1 Dec. 11, 2008

Related U.S. Application Data

(60) Provisional application No. 60/938,714, filed on May 18, 2007.

(30) Foreign Application Priority Data

Mar. 7, 2007 (JP) ................. 2007-057145

(51) Int. Cl.
*G01J 5/00* (2006.01)
*G01B 9/02* (2006.01)
(52) U.S. Cl. .............. 374/129; 356/479; 356/43; 374/1; 250/341
(58) Field of Classification Search .................. 374/120, 374/121, 124, 128, 130–131, 141, 100, 1; 356/450, 216, 226, 234, 923, 503, 504, 479, 356/43; 250/341, 345, 338.1, 336.1, 206, 250/339.04, 339.02, 339.06, 208.05, FOR. 107, 250/341.1, 341.2, 341.6; 438/14, 16
See application file for complete search history.

(56) References Cited

U.S. PATENT DOCUMENTS

| 3,560,098 A * | 2/1971 | Witte et al. .................. 356/434 |
| 3,729,634 A * | 4/1973 | Jensen et al. ................. 250/204 |
| 3,790,283 A * | 2/1974 | Way et al. .................... 356/321 |
| 5,347,128 A * | 9/1994 | Puram et al. .................. 250/330 |
| 5,822,066 A * | 10/1998 | Jeong et al. .................. 356/521 |
| 5,995,223 A * | 11/1999 | Power ......................... 356/495 |
| 6,142,641 A * | 11/2000 | Cohen et al. .................. 359/859 |
| 6,307,633 B1 * | 10/2001 | Mandella et al. ............. 356/479 |
| 6,552,800 B1 * | 4/2003 | Wright et al. ................. 356/497 |
| 7,446,881 B2 * | 11/2008 | Suzuki et al. ................. 356/497 |
| 7,649,630 B2 * | 1/2010 | Hogan ........................ 356/497 |
| 7,876,450 B2 * | 1/2011 | Novotny et al. ............. 356/491 |
| 7,952,717 B2 * | 5/2011 | Abe et al. .................... 356/478 |
| 2006/0077394 A1 | 4/2006 | Suzuki et al. |
| 2007/0238161 A1 * | 10/2007 | Cerrone et al. ............ 435/286.1 |
| 2008/0316896 A1 * | 12/2008 | Usami ......................... 369/103 |

FOREIGN PATENT DOCUMENTS

| EP | 1 441 215 A1 | 7/2004 |
| JP | 2003-199701 | 7/2003 |
| JP | 2006-112826 | 4/2006 |

* cited by examiner

*Primary Examiner* — Gail Verbitsky
(74) *Attorney, Agent, or Firm* — Oblon, Spivak, McClelland, Maier & Neustadt, L.L.P.

(57) ABSTRACT

A temperature measuring apparatus includes a light source, a first splitter, a second splitter, a reference beam reflector, an optical path length adjuster, a reference beam transmitting member, a first to an nth measuring beam transmitting member and a photodetector. The temperature measuring apparatus further includes an attenuator that attenuates the reference beam reflected from the reference beam reflector to thereby make an intensity thereof closer to an intensity of the measurement beam reflected from the temperature measurement object.

5 Claims, 20 Drawing Sheets

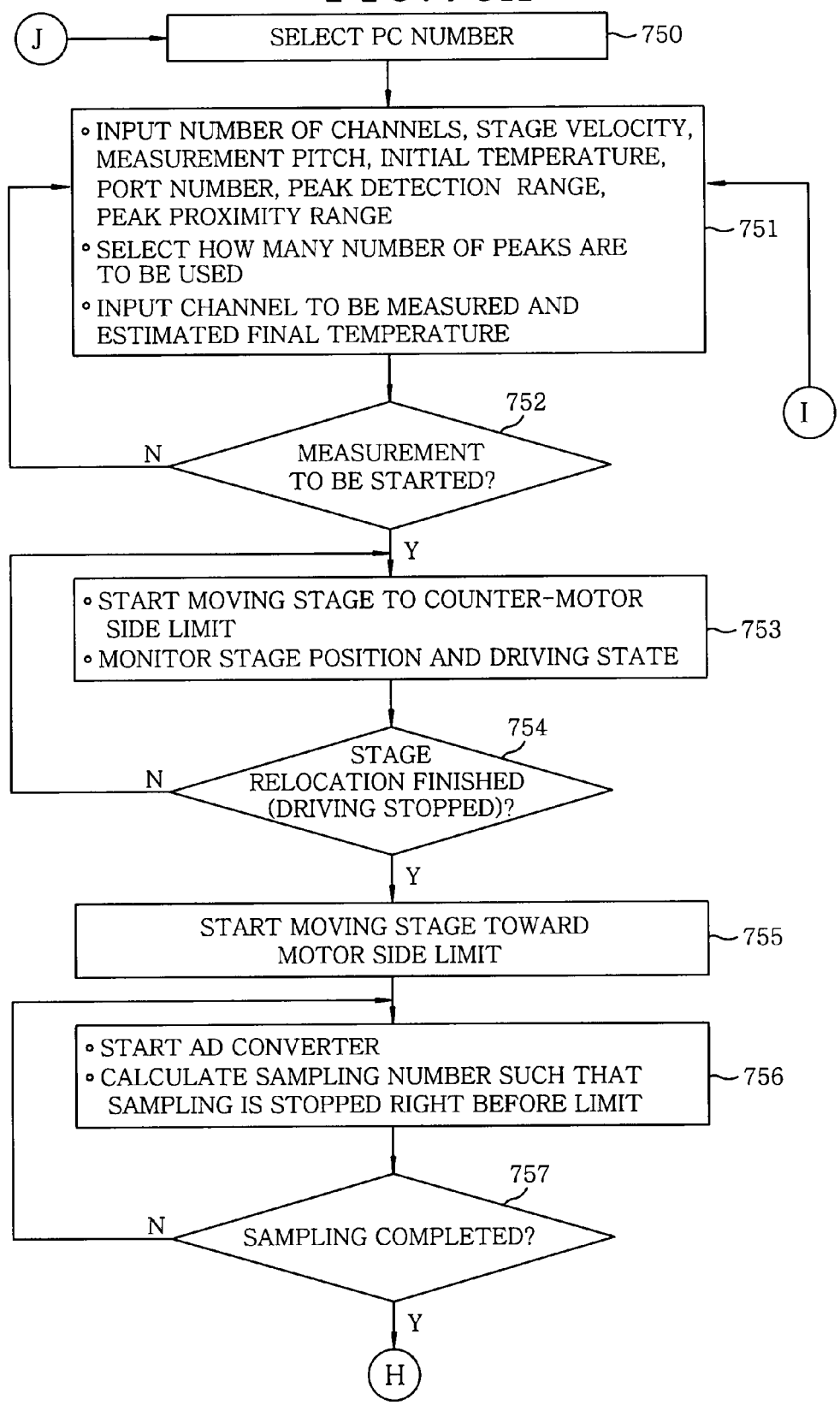

TEMPERATURE MEASURING APPARATUS AND TEMPERATURE MEASURING METHOD

FIELD OF THE INVENTION

The present invention relates to a temperature measuring apparatus and a temperature measuring method capable of accurately measuring a temperature of, e.g., an a front surface, a rear surface and an inner layer of an object such as a semiconductor wafer, a liquid crystal display substrate and the like.

BACKGROUND OF THE INVENTION

In general, accurate measurement of a temperature of a substrate (e.g., a semiconductor wafer) to be processed by a substrate processing apparatus is very important in controlling the shape and property of a film, a hole and the like formed thereon by various processes such as film forming, etching and the like. For this reason, various methods of measuring a temperature of a semiconductor wafer, including a measurement method using a resistance thermometer or a fluorescent thermometer for measuring a temperature of a rear surface of a substrate and the like, have been performed.

In recent years, a temperature measurement technology using a low coherence interferometer capable of directly measuring a temperature of a wafer, which was difficult by the above method, has been proposed.

Further, in the temperature measurement technology using the low coherence interferometer as described above, there is proposed a method (see, for example, Patent Document 1) including the steps of: dividing a light beam originated from a light source into a measurement beam for temperature measurement and a reference beam by using a first splitter; dividing the measurement beam into n number of measurement beams by using a second splitter to irradiate the n number of measurement beams onto n number of measurement points; measuring an interference of reflected beams of the n number of measurement beams and a reflected beam of the reference beam reflected by a reference beam reflector; and measuring temperatures of a plurality of measurement points at the same time. Using such a technology, it is possible to simultaneously measure temperatures of a plurality of measurement points with simple configuration.

(Patent Document 1) Japanese Patent Application Publication No. 2006-112826

SUMMARY OF THE INVENTION

In the above-described prior art, it is possible to simultaneously measure temperatures of a plurality of measurement points with a simple configuration. However, in the prior art discussed above, the light beam generated from the light source is splitted into the measurement beam for the temperature measurement and the reference beam by the first splitter, and then the measurement beam is splitted again into n number of measuring beams by the second splitter. Therefore, if the number of measurement points is increased, the level difference between the reflected beams of thus splitted measuring beams and the reflected reference beam reflected by the reference beam reflector becomes greater. This causes a deterioration in the S/N ratio of the interference signals therebetween, and makes it difficult to perform a high-accuracy measurement.

In view of the above, the present invention provides a temperature measurement apparatus and method capable of simultaneously measuring temperatures of a plurality of measurement points with a higher accuracy than in the prior art, and efficiently performing a substrate process or the like with a higher accuracy.

In accordance with a first aspect of the present invention, there is provided a temperature measuring apparatus including a light source; a first splitter for dividing a light beam emanated from the light source into a measurement beam and a reference beam; at least one second splitter for dividing the measurement beam coming from the first splitter into a first to an nth measuring beam; a reference beam reflector for reflecting the reference beam coming from the first splitter; an optical path length adjuster for adjusting an optical path length of the reference beam reflected from the reference beam reflector; a reference beam transmitting member for transmitting the reference beam coming from the first splitter to a reference beam irradiation position from which the reference beam is irradiated onto the reference beam reflector; a first to an nth measuring beam transmitting member for transmitting the first to the nth measuring beam coming from the second splitters to measuring beam irradiating positions from which the measurement beams are irradiated onto a first to an nth measurement points of a temperature measurement object; a photodetector for measuring an interference between the reference beam reflected from the reference beam reflector and the first to the nth measuring beam reflected from the temperature measurement object, wherein the optical path lengths of the first to the nth measuring beam from the second splitter to the temperature measurement object are different from each other; and an attenuator that attenuates the reference beam reflected from the reference beam reflector such that an intensity thereof becomes closer to an intensity of the measurement beam reflected from the temperature measurement object.

It is preferable that the attenuator attenuates a light beam passing therethrough to $1/\sqrt{n}$ of an original intensity thereof.

In accordance with a second aspect of the present invention, there is provided a temperature measuring apparatus including a light source; a splitter for dividing a light beam emanated from the light source into a reference beam and a first to an nth measuring beam; a reference beam reflector for reflecting the reference beam coming from the splitter; an optical path length adjuster for adjusting an optical path length of the reference beam reflected from the reference beam reflector; a reference beam transmitting member for transmitting the reference beam coming from the splitter to a reference beam irradiation position from which the reference beam is irradiated onto the reference beam reflector; a first to an nth measuring beam transmitting member for transmitting the first to the nth measuring beam coming from the splitter to measuring beam irradiating positions from which the measurement beams are irradiated onto a first to an nth measurement points of a temperature measurement object; and a photodetector for measuring an interference between the reference beam reflected from the reference beam reflector and the first to the nth measuring beam reflected from the temperature measurement object, wherein the optical path lengths of the first to the nth measuring beam from the splitter to the temperature measurement object are different from each other.

In accordance with a third aspect of the present invention, there is provided a temperature measuring apparatus including a light source; a first splitter for dividing a light beam emanated from the light source into a measurement beam and a reference beam; at least one second splitter for dividing the measurement beam coming from the first splitter into a first to an nth measuring beam; a reference beam reflector for reflecting the reference beam coming from the first splitter; an optical path length adjuster for adjusting an optical path length of the reference beam reflected from the reference beam reflector; a reference beam transmitting member for transmitting the reference beam coming from the first splitter to a reference beam irradiation position from which the reference beam is irradiated onto the reference beam reflector; a first to an nth measuring beam transmitting member for transmitting the first to the nth measuring beam coming from the second splitters to measuring beam irradiating positions from which the measurement beams are irradiated onto a first to an nth measurement points of a temperature measurement object; a photodetector for measuring an interference between the reference beam reflected from the reference beam reflector and the first to the nth measuring beam reflected from the temperature measurement object, wherein the optical path lengths of the first to the nth measuring beam from the second splitter to the temperature measurement object are different from each other; and an AC component extractor that extracts an AC component from an output signal of the photodetector.

In the above aspects of the present invention, it is preferable that the temperature measurement object is a substrate to be processed by a substrate processing apparatus, and the first to the nth measuring beam transmitting member are arranged in the substrate processing apparatus such that the first to the nth measuring beam are irradiated onto a plurality of measurement points in a surface of the substrate.

In the first and the third aspect of the present invention, it is preferable that the temperature measurement object is a substrate to be processed by a substrate processing apparatus including a plurality of process chambers in each of which a process is performed on the substrate, wherein the first to the nth measuring beam transmitting member are arranged in each of the process chambers such that the first to the nth measuring beam are irradiated onto a plurality of measurement points in a surface of the substrate, and a plurality of the second splitters are respectively provided for the process chambers, wherein a selector is provided between the first splitter and the second splitters for selecting one of the second splitters to be used, and wherein the temperature measuring apparatus is capable of measuring a temperature of the substrate in the process.

In the first and the third aspect of the present invention, it is preferable that the temperature measurement object is a substrate to be processed by a substrate processing apparatus including a plurality of process chambers in each of which a process is performed on the substrate, wherein the first to the nth measuring beam transmitting member are arranged in each of the process chambers such that the first to the nth measuring beam are irradiated onto a plurality of measurement points in a surface of the substrate, and a plurality of the second splitters are respectively provided for the process chambers, wherein a third splitter is provided between the first splitter and the second splitters, which divides the measurement beam coming from the first splitter into divided beams to thereby output the divided beams to the second splitters, respectively, and wherein the temperature measuring apparatus is capable of measuring a temperature of the substrate in the process.

In accordance with a fourth aspect of the present invention, there is provided a temperature measuring method, including irradiating a first to an nth measuring beam whose optical path lengths are different from each other onto respective measurement points of a temperature measurement object while irradiating a reference beam onto a reference beam reflector; attenuating the reference beam reflected from the reference beam reflector such that an intensity thereof becomes closer a total intensity of the first to the nth measuring beam by using an attenuator; measuring interferences between the attenuated reference beam reflected from the reference beam reflector and the first and the nth measuring beam reflected from the temperature measurement object while moving the reference beam reflector in one direction to thereby change an optical path length of the reference beam reflected from the reference beam reflector; and measuring temperatures at the respective measurement points of the temperature measurement object based on the results of measuring the interferences.

It is preferable that the attenuator attenuates a light beam passing therethrough to $1/\sqrt{n}$ of an original intensity thereof.

In accordance with the present invention, it is possible to provide a temperature measurement apparatus and method capable of simultaneously measuring temperatures of a plurality of measurement points with a higher accuracy than in the prior art, and efficiently performing a substrate process or the like with a higher accuracy.

BRIEF DESCRIPTION OF THE DRAWINGS

The above features of the present invention will become apparent from the following description of the embodiments, given in conjunction with the accompanying drawings, in which:

FIGS. 15A and 15B present a flow chart for explaining a method of detecting an initial peak position in a plurality of process chambers.

DETAILED DESCRIPTION OF THE EMBODIMENTS

Figure 1:
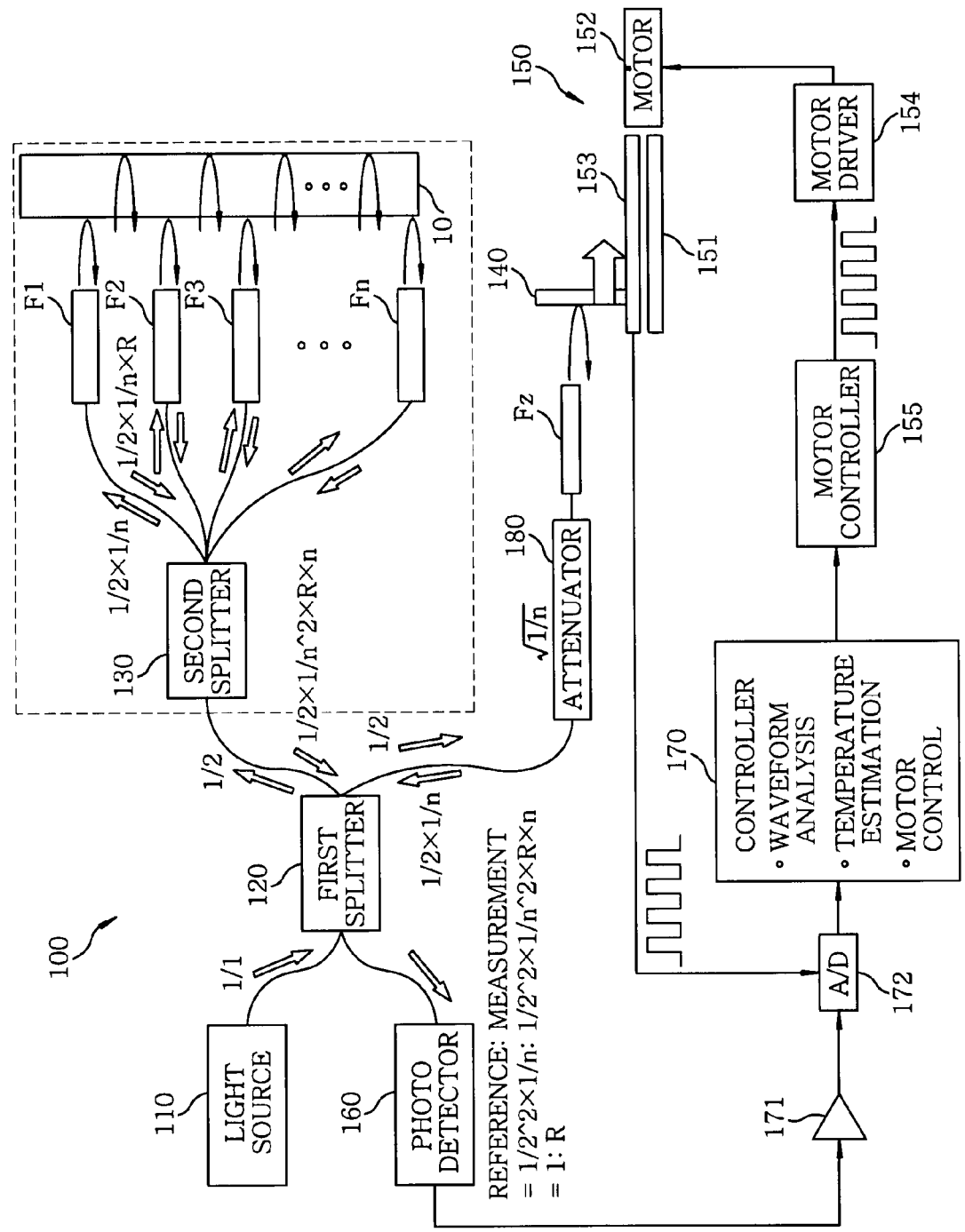
FIG. 1 is a block diagram illustrating a schematic configuration of a temperature measurement apparatus in accordance with an embodiment of the present invention.

Hereinafter, embodiments of the present invention will be described in detail with reference to the accompanying drawings, which form a part hereof. In addition, throughout the following description and the accompanying drawings, like reference numerals designate like components, and the descriptions thereof will not be repeated.

FIG. 1 shows a block diagram showing a schematic configuration of a temperature measurement apparatus 100 in accordance with an embodiment of the present invention. As shown therein, the temperature measurement apparatus 100 includes a light source 110; a first splitter 120 for dividing a light beam emanated from the light source 110 into a reference beam and a measurement beam for temperature measurement; a second splitter 130 for dividing the measurement beam coming from the first splitter 120 into a first to an nth measuring beam; a reference beam reflector 140 for reflecting the reference beam coming from the first splitter 120; and an optical path length adjuster 150 for varying an optical path length of the reference beam reflected from the reference beam reflector 140.

The optical path length adjuster 150 includes a linear stage 151 for moving the reference beam reflector 140 (which has, for example, a reference mirror) in a direction parallel to an incident direction of the reference beam; a motor 152; and a He—Ne laser encoder 153. As described above, by driving the reference mirror in one direction, the optical path length of the reference beam reflected from the reference mirror can be varied. The motor 152 is controlled by a controller 170 via a motor controller 155 and a motor driver 154. In addition, a signal from the He—Ne laser encoder 153 is converted into a digital signal by an A/D converter 172, and then is inputted to the controller 170.

Further, the temperature measurement apparatus 100 includes a photodetector 160 for measuring the interference between: (a) the first to nth measuring beams reflected from a temperature measurement object 10 after the first to nth measuring beams are irradiated onto a first to an nth measurement point of the temperature measurement object 10 such as a semiconductor wafer, and (b) the reference beam reflected from the reference beam reflector 140 after the reference beam is irradiated onto the reference beam reflector 140.

The kind of light adopted by the light source 110 is not particularly limited, so long as the interference between the measuring beams and the reference beam can be measured. When the temperature measurement of the semiconductor wafer as the temperature measurement object 100 is performed, the light may preferably be chosen such as not to cause an interference between two reflected beam beams reflected respectively at a front surface of the semiconductor wafer and a rear surface of the semiconductor wafer (the distance therebetween is, typically, about 800 to 1500 μm).

Specifically, it is preferable to use a low coherence light. The low coherence light is a kind of light having a short coherence length. For example, a center wavelength of the low coherence light may preferably be 0.3 to 20 μm; and more preferably, 0.5 to 5 μm. Further, the coherence length may preferably be 0.1 to 100 μm; and more preferably, 3 μm or less. By using the low coherence light for the light source 110, it is possible to avoid problems due to the presence of unwanted interference, and it becomes easier to measure the interference between the reference beam and the measurement beam reflected from a surface or an inner layer of the semiconductor wafer.

The light source using the low coherence light may be a super luminescent diode (SLD), an light emitting diode (LED), a high brightness lamp (a tungsten lamp, a xenon lamp and the like), an ultra-wideband wavelength light source or the like. Among these low coherence light sources, an SLD having a high brightness (whose wavelength is, for example, 1300 nm) may preferably be used as the light source 110.

As the first splitter 120, an optical fiber coupler may be used. However, it is not particularly limited so long as it can divide a light beam into a reference beam and a measurement beam. In addition, as the second splitter 130, an optical fiber coupler may be used as well. However, it is also not particularly limited so long as it is capable of dividing the measurement beam into a first to an nth measuring beam. Alternatively, an optical waveguide demultiplexer, a semitransparent mirror and the like may also be employed as the first splitter 120 and the second splitter 130.

The reference beam reflector 140 includes, for example, a reference mirror. A corner cube prism, a plane mirror and the like may be adopted as the reference mirror. Among them, a corner cube prism may preferably be used when the reflected beam needs to be parallel to the incident light. However, without being limited thereto, the reference beam reflector 140 may be configured with other devices (for example, optical delay lines) so long as they can reflect the reference beam.

As the photodetector 160, a photodiode may be used in consideration of a low price and a good compactness. Specifically, the photodetector 160 may be formed of a photodetector (PD) using, for example, a Si photodiode, an InGaAs photodiode, a Ge photodiode and the like. However, without being limited thereto, the photodetector 160 may be constituted of other devices such as an avalanche photodiode, a photomultiplier tube and the like, so long as they can measure the interference between the measurement beam reflected from the temperature measurement object 10 and the reference beam reflected from the reference beam reflector 140. A detection signal of the photodetector 160 is inputted to the A/D converter 172 via an amplifier 171 to be converted into a digital signal, and then is processed by the controller 170.

The reference beam coming from the first splitter 120 is guided to a reference beam irradiation position (from which the reference beam is irradiated onto the reference beam reflector 140) via a reference beam transmitting member such as a collimator fiber Fz. Thus, the first to nth measuring beams coming from the second splitter 130 are guided to a measuring beam irradiating positions (from which the measuring beams are irradiated onto the temperature measurement object 10) via a first to an nth measuring beam transmitting member such as collimator fibers F1 to Fn. However, the first to nth measuring beam transmitting members are not limited thereto; and may be, for example, optical fibers having collimators attached thereto at front ends thereof.

In the temperature measurement apparatus 100, the first to nth measuring beams have different optical path lengths from the second splitter 130 to the temperature measurement object 10. Specifically, if the lengths of the collimator fibers F1 to Fn are identical to each other, front end surfaces of the collimator fibers F1 to Fn (whose positions are the measuring beam irradiating positions) are arranged such that the distances between the temperature measurement object 10 and the front end surfaces of the collimator fibers F1 to Fn are different from each other approximately in the irradiating direction. Further, it is also possible to set the optical path lengths of the first to nth measuring beam to be different from each other by varying the lengths of the collimator fibers F1 to Fn or the optical fibers without arranging the front end surfaces of the collimator fibers F1 to Fn to be spatially deviated as above.

Further, when the first to nth measuring beam transmitting members are arranged to be deviated from each other approximately in the irradiating direction with respect to the temperature measurement object 10, it is necessary to prevent an overlapping of two or more interference waves induced by the individual measuring beams in cooperation with the reference beam, wherein the interference waves are to be measured for respective measurement points. If, for example, a low coherence light source is used as the light source 110, it is possible to prevent such an overlapping of the interference waves by arranging the first to nth measuring beam transmitting members such that the distances between the temperature measurement object 10 and the respective measuring beams differ from each other by at least the coherence length of the interference wave.

Furthermore, it is preferable that the positions at which the first to nth measuring beam transmitting members are located are set by considering the thickness of the temperature measurement object, the rate of change in thickness, the temperature range to be measured, the moving distance (i.e., displacement) of the reference mirror and the like. Specifically, in case of a silicon wafer having a thickness of about 0.7 mm, the moving distance of the reference mirror in a temperature range from a room temperature to 200° C. is about 0.04 mm. Therefore, in this case, the first to nth measuring beam transmitting members may be arranged to be spatially deviated from each other in the irradiating direction with intervals of about 0.1 mm. In this manner, the interference waves can be prevented from being superimposed on each other at the measurement points.

Thus, by irradiating onto the reference beam reflector 140 only once, the interference waves can be detected simultaneously at the measurement points onto which the first to nth measuring beams are irradiated. Therefore, the time required for the temperature measurement can be reduced.

In the temperature measurement apparatus 100 in accordance with the present embodiment, an attenuator 180 is provided as a light attenuation means in an optical path of the reference beam branched off at the first splitter 120. The attenuator 180 attenuates the reference beam such that the intensity of the reflected beam of the reference beam becomes closer to the total intensity of the reflected beams of the first to nth measuring beams. Specifically, as shown in FIG. 1, the attenuator 180 may be configured such that the intensity of a light beam having passed therethrough is attenuated to, e.g., about $1/\sqrt{n}$ of the original intensity.

In case of providing the attenuator 180, the intensity of the reflected beam of the reference beam entering the photodetector 160 is about $(1/2)^2 \times (1/n)$ of the original intensity of the light generated from the light source 100, since the intensity is attenuated by the factor of $(1/2)^2$ by passing through the first splitter 120 two times, and again by the factor of $1/n$ by passing through the attenuator 180 two times. Further, the reflectivity of the reference beam reflector 140 is set to be about 1.

Meanwhile, if the reflectivity of the temperature measurement object 10 is R, the reflected beam of the measurement beams entering the photodetector 160 is attenuated by the factor of $(1/2)^2$ by passing through the first splitter 120 two times, and again by the factor of $(1/n)^2$ (for example, 1/16 when n=4) by passing through the second splitter 130 two times. Therefore, the resultant factor of the attenuation is about $(1/2)^2 \times (1/n)^2 \times R \times n = (1/2)^2 \times (1/n) \times R$, because there are n number of the reflected beams of the measuring beams, each of which undergoes the reflectivity of R.

Therefore, the difference between the intensity of the reflected beam of the reference beam and that of the reflected beams of the first to nth measuring beams occurs only by the reflectivity R of the temperature measurement object 10. As a result, it is substantially same as the case of a one-point measurement in which the second splitter 130 is not provided.

Figure 2A:
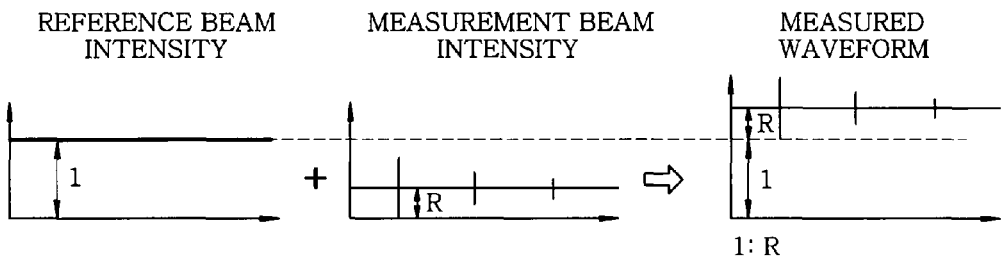
FIGS. 2A to 2D are views for explaining the relationship between an intensity of a reference beam and that of a measurement beam.

As shown in FIG. 2A, in case of the one-point measurement, the intensity of the reflected beam of the measurement beam is R if the intensity of the reflected beam of the reference beam is 1, and the ratio of the intensity of the reference beam to that of the measurement beam included in a measured waveform is 1:R (i.e., reference beam:measurement beam=1:R).

Figure 2B:
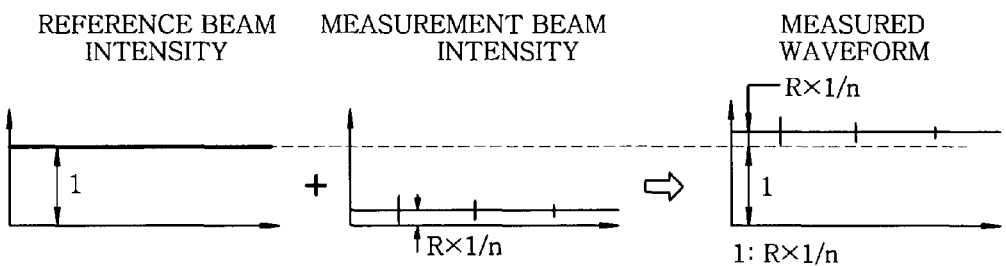

Further, as shown in FIG. 2B, in case of the conventional n-point measurement, the intensity of the reflected beam of the measurement beam is $R \times (1/n)$ of the intensity of the reflected beam of the reference beam, and the ratio of the intensity of the reference beam to that of the measurement beam included in a measured waveform is $1:R \times (1/n)$ (i.e., reference beam:measurement beam=$1:R \times (1/n)$). Therefore, the level difference between the reference beam and the measurement beam increases as the number n becomes larger. Further, the intensity of interference is determined by the intensity of the measurement beam. Therefore, when the level difference between the reference beam and the measurement beam becomes very large, the intensity of interference becomes negligible compared to the intensity of the reference beam, thereby deteriorating the S/N ratio.

Figure 2C:
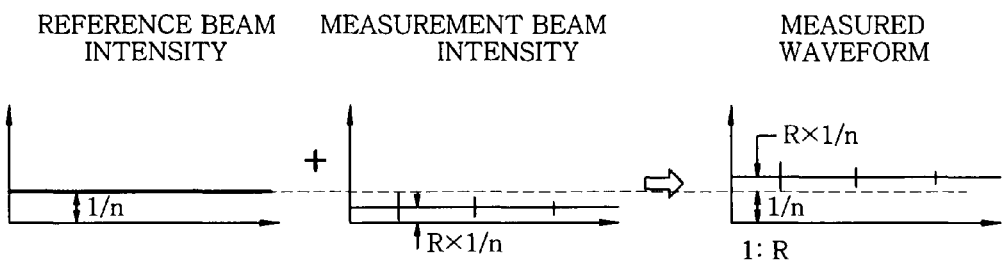

However, in accordance with the temperature measurement apparatus 100 of the present embodiment, the intensity of the reflected beam is attenuated by the factor of $1/n$ by the attenuator 180. Therefore, as shown in FIG. 2C, the ratio of the intensity of the reference beam to that of the measurement beam included in a measured waveform is 1:R (i.e., reference beam:measurement beam=1:R), which is same as in case of the one-point measurement. In this manner, the S/N ratio can be enhanced compared to the case of FIG. 2B. Further, although it has been described in the above that the light level is attenuated to $1/\sqrt{n}$ by the attenuator 180, the attenuation level is not limited thereto, and may be properly selected otherwise.

Figure 3:
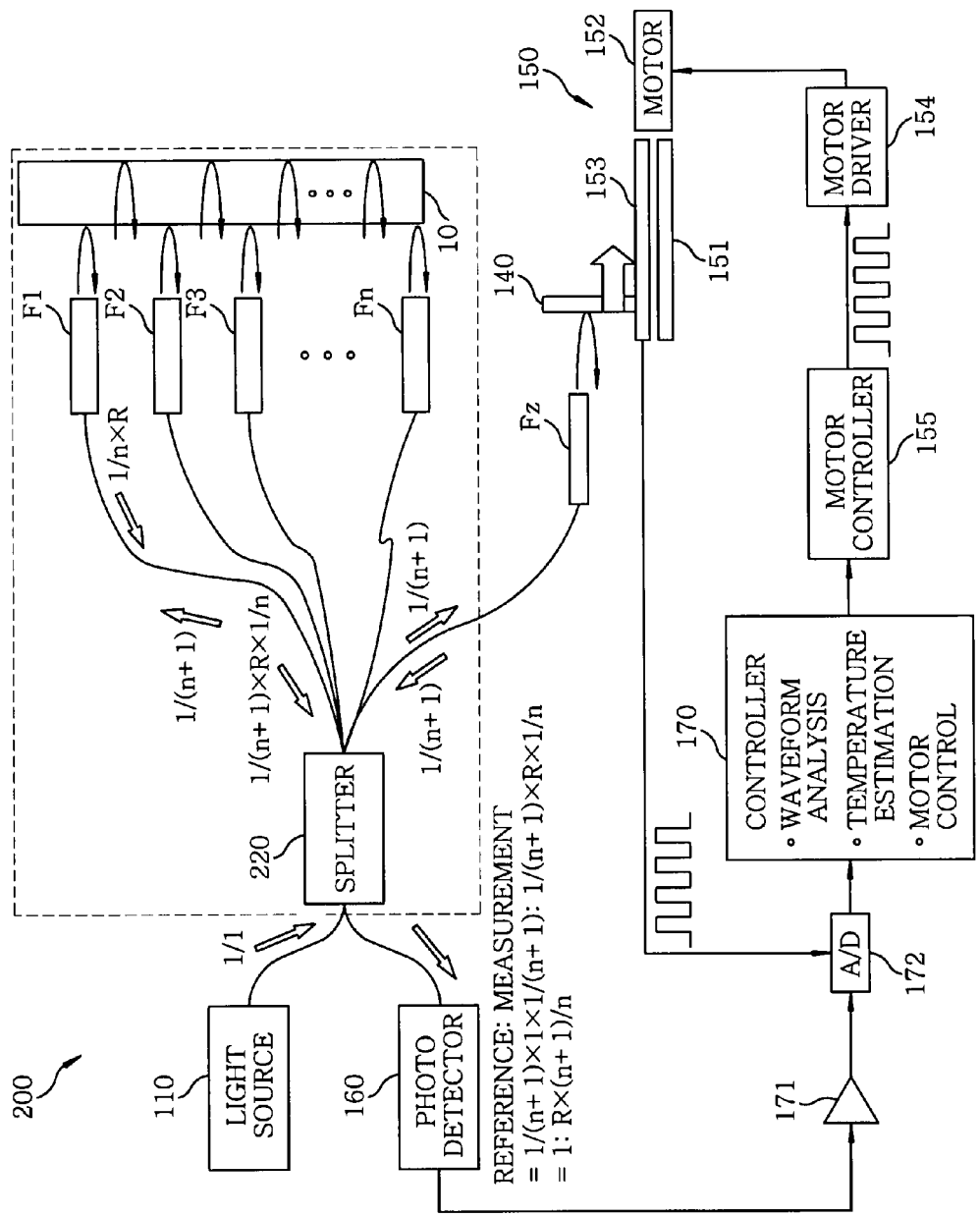
FIG. 3 is a block diagram illustrating a schematic configuration of a temperature measurement apparatus in accordance with another embodiment of the present invention.

Hereinafter, a second embodiment of the present invention will be described with reference to FIG. 3. A temperature measurement apparatus 200 shown in FIG. 3 employs a single splitter 220 for splitting a light beam emanated from the light source 110, instead of the first splitter 120 and the second splitter 130 in FIG. 1. The splitter 220 splits the light beam generated from the light source 110 into (N+1) number of beams including a first to an nth measuring beam and a reference beam. The other parts are the same as those of the temperature measurement apparatus 100 shown in FIG. 1.

Figure 2D:
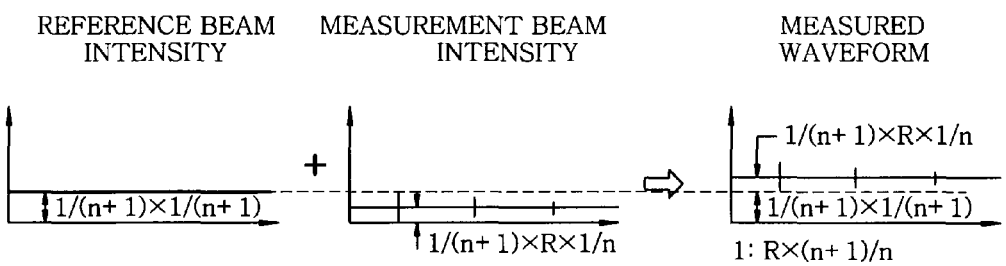

As shown in FIG. 2D, in case of employing the temperature measurement apparatus 200, the ratio of the intensity of the reference beam to that of the measurement beam included in a measured waveform is $1:R \times (n+1)/n$ (i.e., reference beam:measurement beam=$1:R \times (n+1)/n$), which is approximately the same as in case of the one-point measurement. In this manner, it is possible to improve the S/N ratio in comparison with the case of FIG. 2B.

Figure 4:
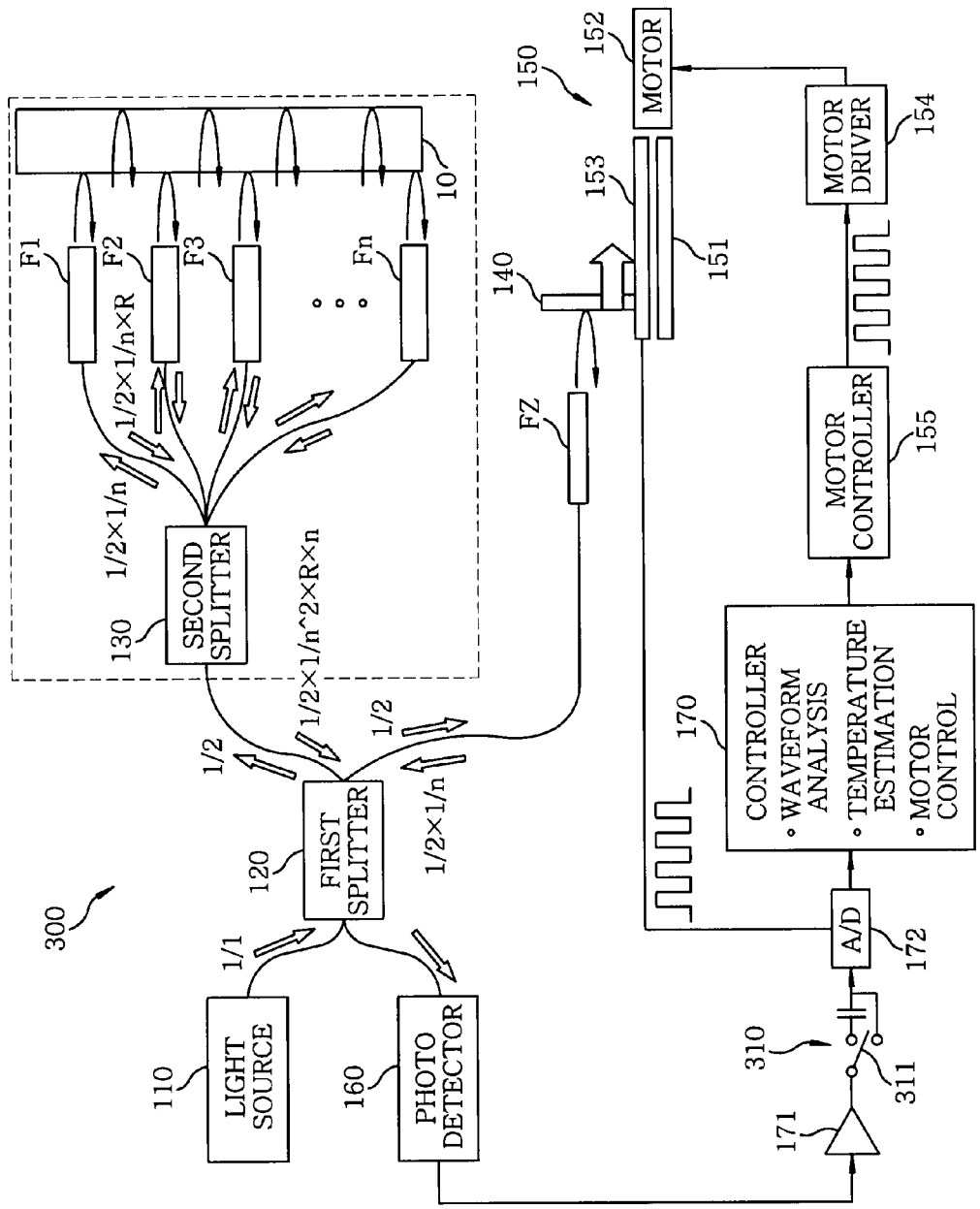
FIG. 4 is a block diagram illustrating a schematic configuration of a temperature measurement apparatus in accordance with still another embodiment of the invention.

Next, a third embodiment of the present invention will be described with reference to FIG. 4. As shown therein, a temperature measurement apparatus 300 does not include the attenuator 180 in the temperature measurement apparatus 100 of FIG. 1, but instead includes an AC component extractor 310 capable of extracting an AC component from a detection signal of the photodetector 160. In addition, the temperature measurement apparatus 300 further includes a switch 311 for switching the state of the AC component extractor 310 between a first state where the AC component is extracted by the AC component extractor 310 and a second state where the total signal passes through the AC component extractor 310, thereby making it possible to check the DC level (light intensity). The other parts of the temperature measurement apparatus 300 are the same as those of the temperature measurement apparatus 100 shown in FIG. 1.

In accordance with the temperature measurement apparatus 300, the AC component can be extracted by the AC component extractor 310. Thus, the interference intensity can be measured in AC level without depending on DC level. Therefore, the S/N ratio can be enhanced compared to the case of FIG. 2B.

Hereinafter, a temperature measurement apparatus 400 and a temperature measurement apparatus 500, which are capable of measuring respective temperatures in a plurality of process chambers in a substrate processing apparatus, will be described with reference to FIGS. 5 and 6.

Figure 5:
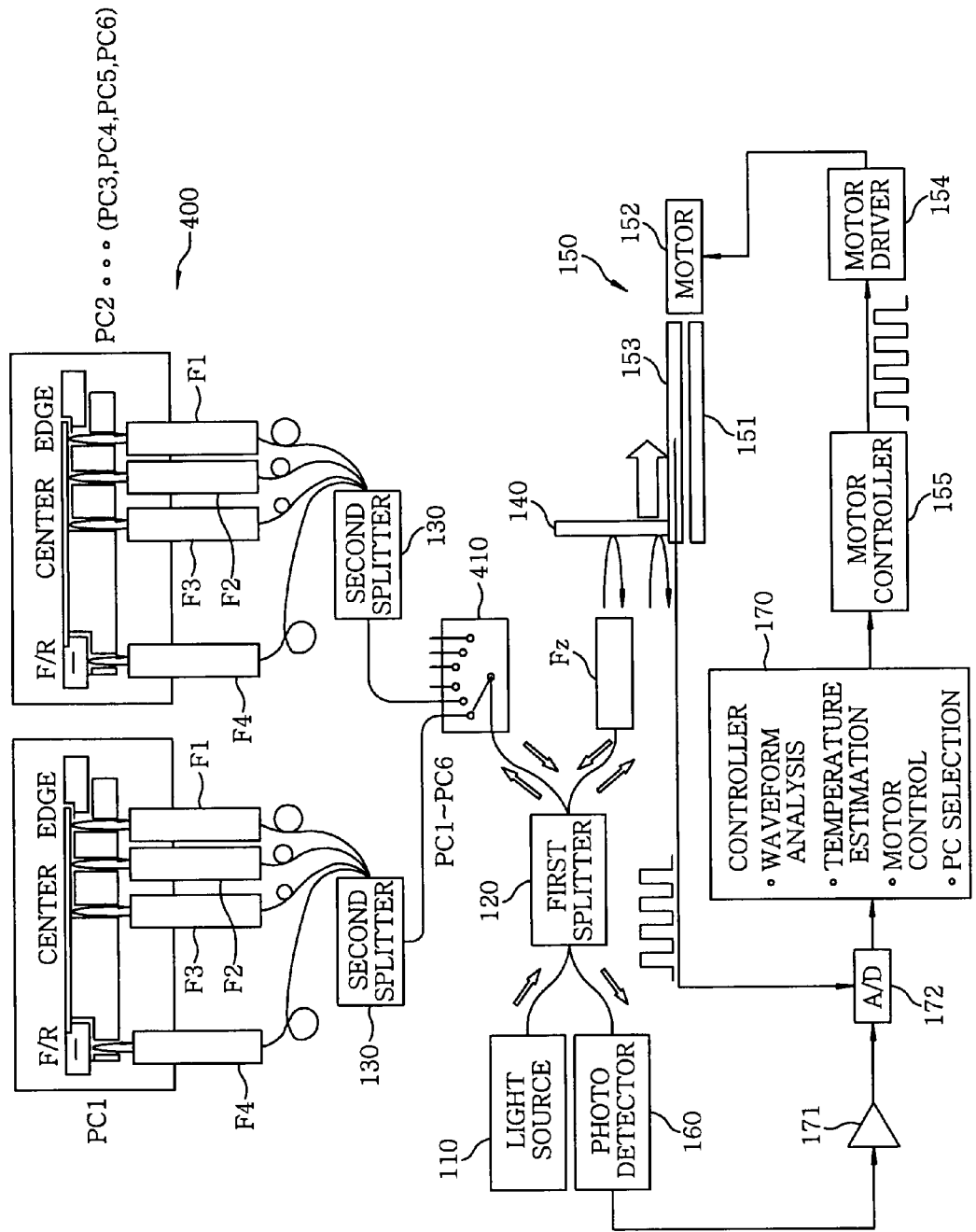
FIG. 5 is a block diagram illustrating a schematic configuration of a temperature measurement apparatus in accordance with still another embodiment of the invention.

In accordance with the temperature measurement apparatus 400 shown in FIG. 5, one among a plurality of (in this example, six) process chambers PC1, PC2, . . . , PC6 is selected by a selector 410 such as an optical add/drop multiplexer (OADM) in a manner that it is possible to measure a temperature of each of substrates disposed in the respective process chambers, and, if necessary, a temperature of each of focus rings F/R as well.

More specifically, a second splitter 130 and a first to an nth measuring beam transmitting member, e.g., collimator fibers F1 to Fn (n=4 in the examples of FIGS. 5 and 6) are disposed in each of the process chambers PC1, PC2, . . . , PC6, and the selector 410 is provided between the first splitter 120 and each of the six second splitters 130. By selecting one of the process chambers PC1, PC2, . . . , PC6 for performing temperature measurement by using the selector 410, the temperature of each of the process chambers PC1, PC2, . . . , PC6 can be measured. In each of the process chambers PC1, PC2, . . . , PC6, a process such as etching or film forming is performed on a substrate such as a semiconductor wafer.

Figure 6:
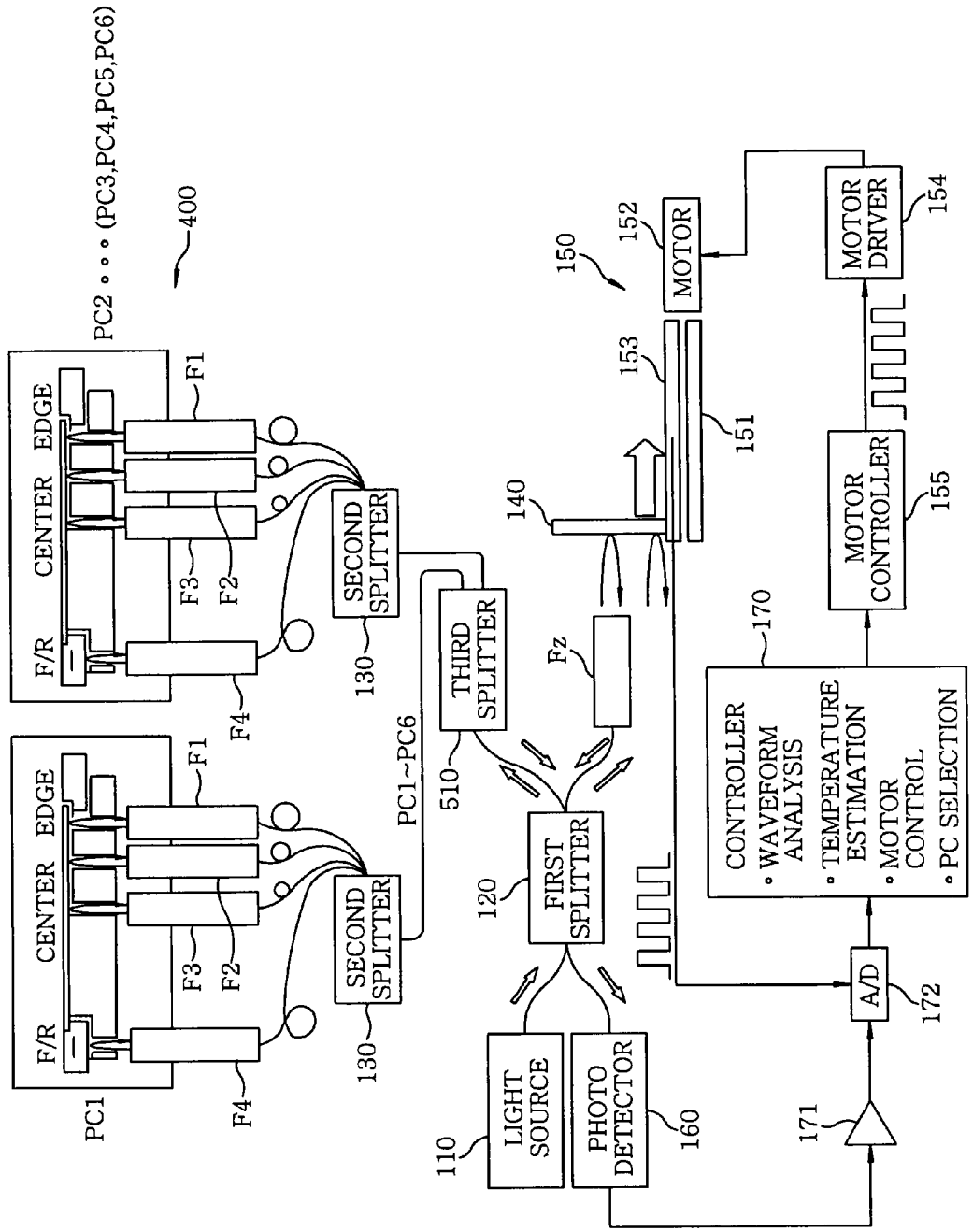
FIG. 6 is a block diagram illustrating a schematic configuration of a temperature measurement apparatus in accordance with still another embodiment of the invention.

Further, in the temperature measurement apparatus 500 shown in FIG. 6, a third splitter 510 is interposed between a first splitter 120 and second splitters 130 provided for a plurality of (e.g., six) process chambers PC1, PC2, . . . , PC6. Thus, a measurement beam, having been branched off at the first splitter 120 from a light beam generated by the light source 110, is splitted into six divided beams to be sent to each of the second splitters 130 for the six process chambers PC1, PC2, . . . , PC6. In this manner, it is possible to measure the temperatures of a substrate and a focus ring disposed in each of the process chambers PC1, PC2, . . . , PC6.

In the temperature measurement apparatuses 400 and 500, the process chambers PC1, PC2, . . . , PC6 share the light source 110, the first splitter 120, a reference beam reflector 140, an optical path length adjuster 150, a photodetector 160, a controller 170 and the like in measuring the temperature. Therefore, it is possible to suppress an increase in cost compared to the case where each of the process chambers has its own temperature measurement apparatus. In addition, since a single controller 170 can manage the whole measurement data, it is possible to save the time and cost required for the data management.

In accordance with the temperature measurement apparatus 400 or 500, the controller 170 stores in advance interference position data for the process chambers PC1, PC2, . . . , PC6, respectively; and, when necessary, retrieves the interference position data to thereby use the data for the process chambers PC1, PC2, . . . , PC6. Further, in case of measuring temperatures at a plurality of measurement points in the process chambers PC1, PC2, . . . , PC6, the controller 170 stores in advance each of interference position data for the measurement positions; and, when necessary, retrieves the interference position data to thereby use the data for the process chambers PC1, PC2, . . . , PC6.

Figure 7:
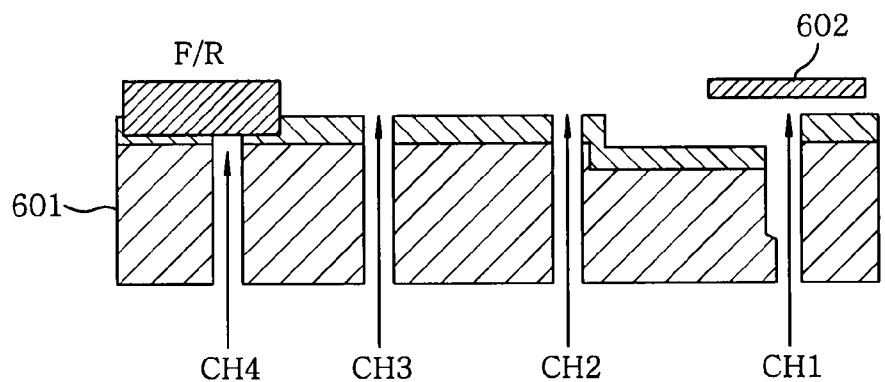
FIGS. 7 to 9 are cross-sectional views for explaining a method of detecting an initial peak position.
Figure 8:
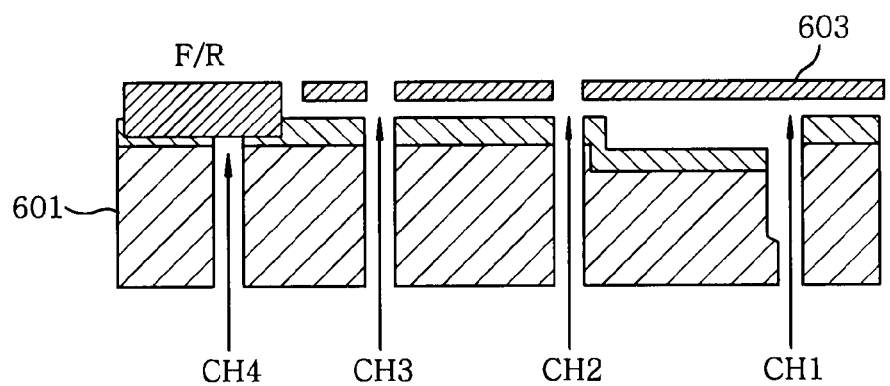
Figure 9:
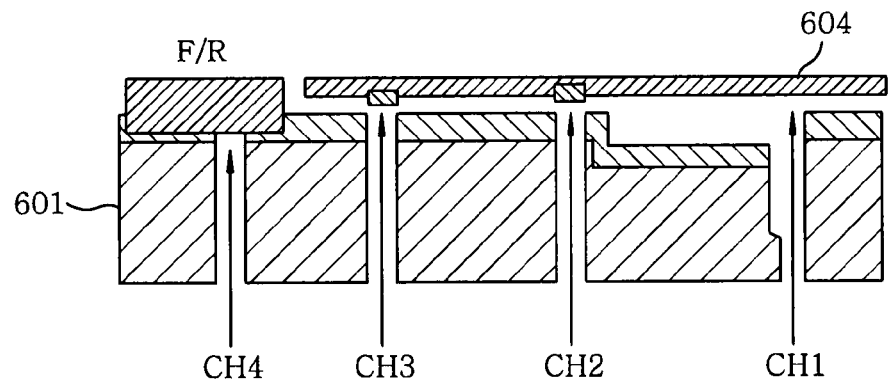

Hereinafter, a method of measuring interference positions (initial peak positions) of the measurement points will be described. As shown in FIG. 7, a wafer piece 602 is mounted on a mounting table 601 in such a manner that a reflected beam is detected only from a specified measurement point (e.g., channel CH1 in FIG. 7) to be measured. Alternatively, as shown in FIG. 8, a perforated wafer 603 is mounted on the mounting table 601, wherein the perforated wafer 603 has holes in such a manner that a reflected beam is detected only from a specified measurement point (e.g., channel CH1 in FIG. 8) to be measured and not from the other measurement points. Alternatively, as shown in FIG. 9, a rear-surface-treated wafer 604 is mounted on the mounting table 601, wherein the rear surface of the rear-surface-treated wafer 604 is treated such that a strong reflected beam is detected only from a specified measurement point (e.g., channel CH1 in FIG. 9) to be measured, and light reflection is weak from the other measurement points. In any of the above cases, a reflected beam is substantially detected from only a specified measurement point (channel CH1) to be measured.

Figure 10A:
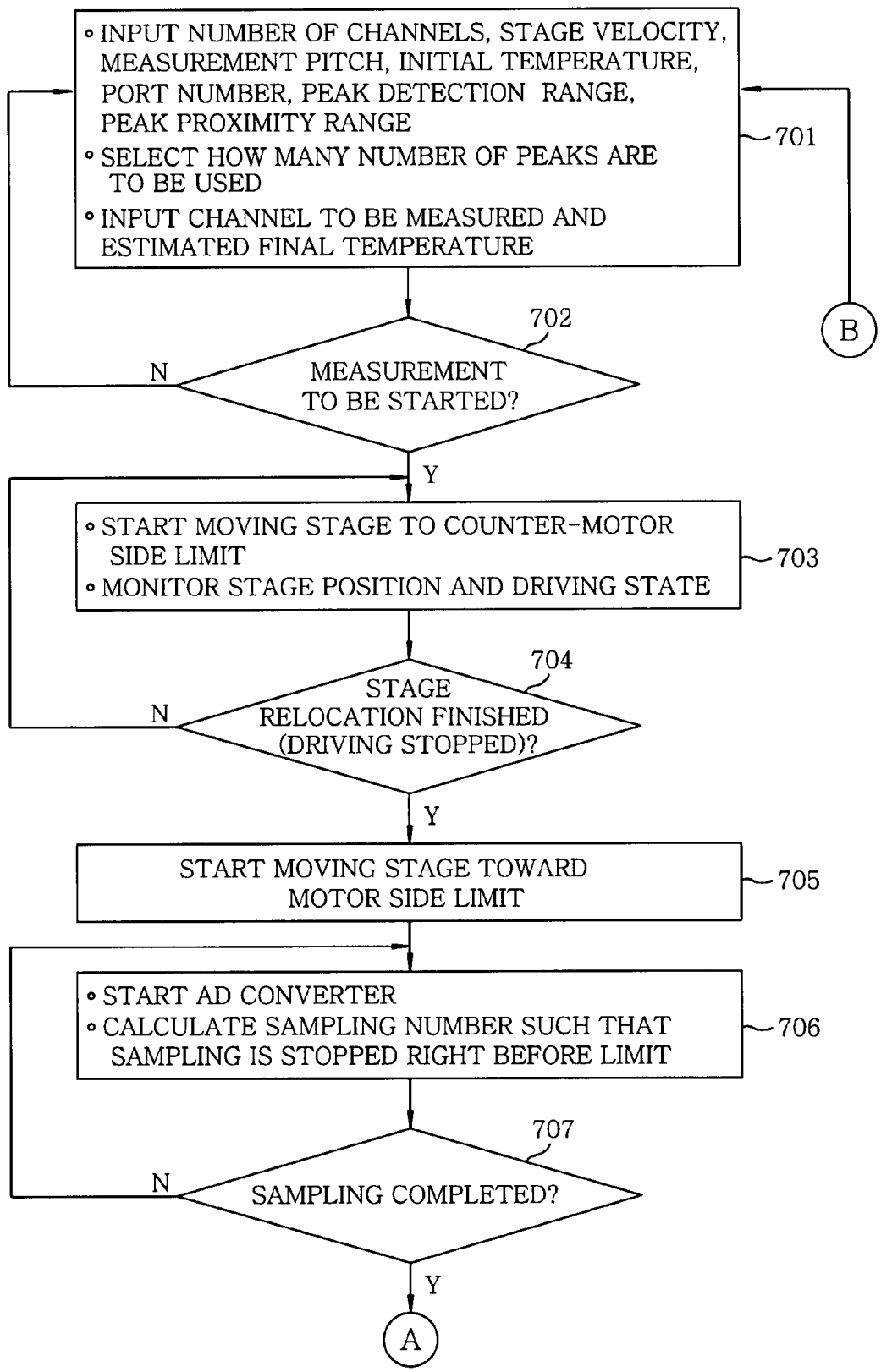
FIGS. 10A and 10B present a flow chart for explaining a method of detecting an initial peak position.
Figure 10B:
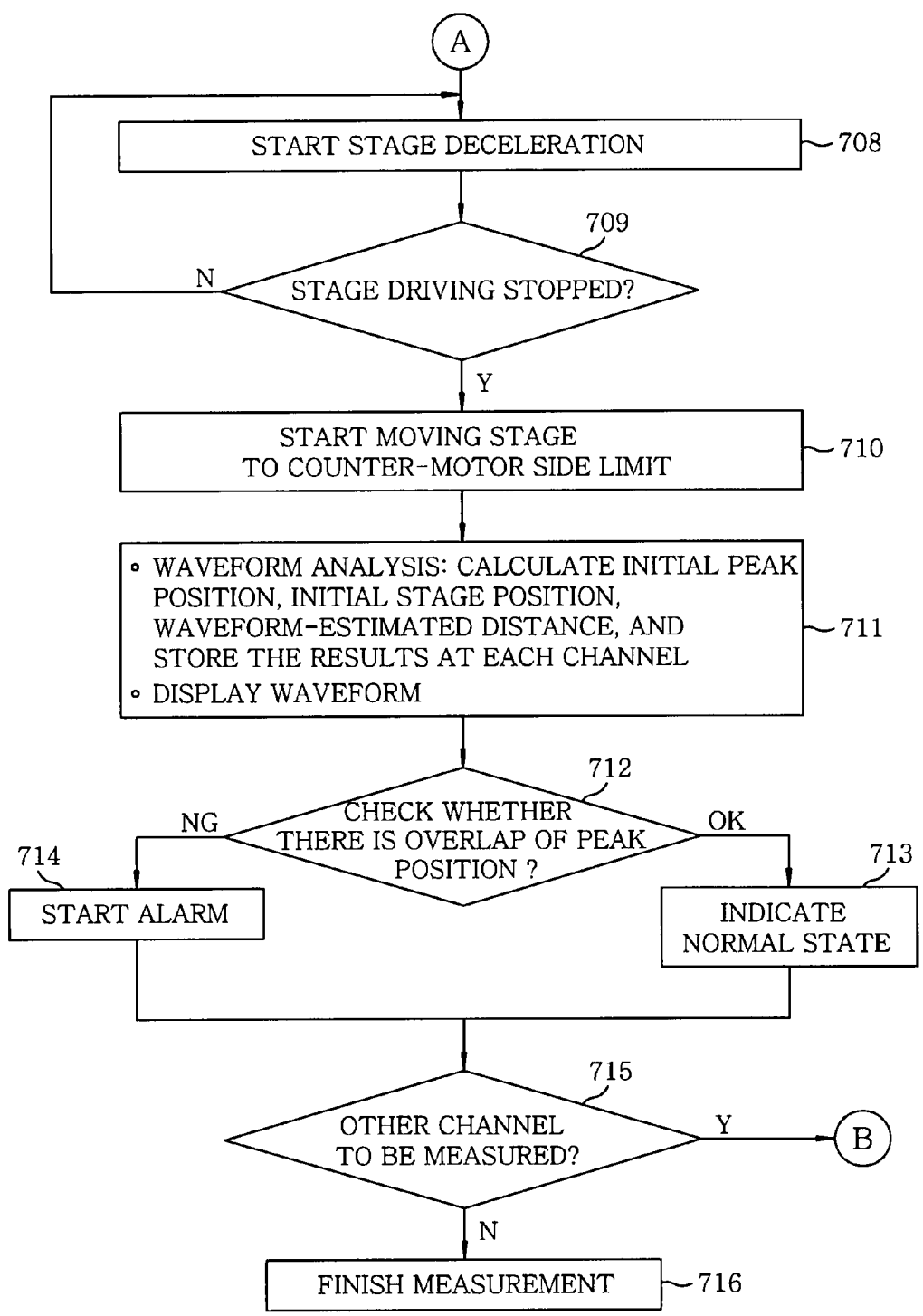

Thereafter, an initial peak position is detected under the control of the controller 170 as follows. At first, as shown in a flow chart of FIGS. 10A and 10B, measurement conditions including the number of channels, a stage velocity, a measurement pitch, an initial temperature, a port number, a peak detection range, a peak proximity range, the number of peaks to be used, a channel to be measured and an expected final temperature are inputted (step 701); and then the measurement is started (YES in step 702).

Next, the controller 170 starts moving the linear stage 151 to a counter-motor side limit (i.e., a location that minimizes an optical path length of the reference beam), and monitors the stage position and the driving state (step 703). Then, the controller 170 stops the driving when the relocation of the stage is completed (YES in step 704).

Thereafter, the controller 170 starts moving the linear stage 151 toward a motor side limit which is a limit located opposite to the counter-motor side limit (step 705); and initiates the sampling of the A/D converter 172 (step 706). At this time, the controller 170 calculates a sampling number such that the sampling is stopped immediately before the limit.

When the sampling is completed (YES in step 707), the controller 170 starts a deceleration and stoppage of the linear stage 151 (step 708); and stops the driving of the linear stage 151 (YES in step 709).

Subsequently, the controller 170 starts moving the linear stage 151 to the counter-motor side limit (step 710).

Further, the controller 170 executes a waveform analysis to calculate an initial peak position, an initial stage position and a waveform-estimated distance. Herein, the waveform-estimated distance is calculated as follows: (waveform-estimated distance)=(maximum peak-detected distance)−(minimum peak-detected distance)+(stage displacement at acceleration and deceleration). The controller stores the results for each channel, and shows the waveform (step 711).

Next, the controller 170 determines whether there is any overlapping in peak position (step 712). Then, the controller 170 displays "normal" if there is no overlapping in peak position (step 713); and display "alarm" if there is a peak position overlapping (step 714).

Subsequently, the controller 170 determines whether a measurement of other channel is to be performed (step 715). Then, if the measurement is to be performed on other channel, the above steps are repeated. However, if there is no other channel to be measured, the controller 170 finishes the process (step 716).

Figure 11:
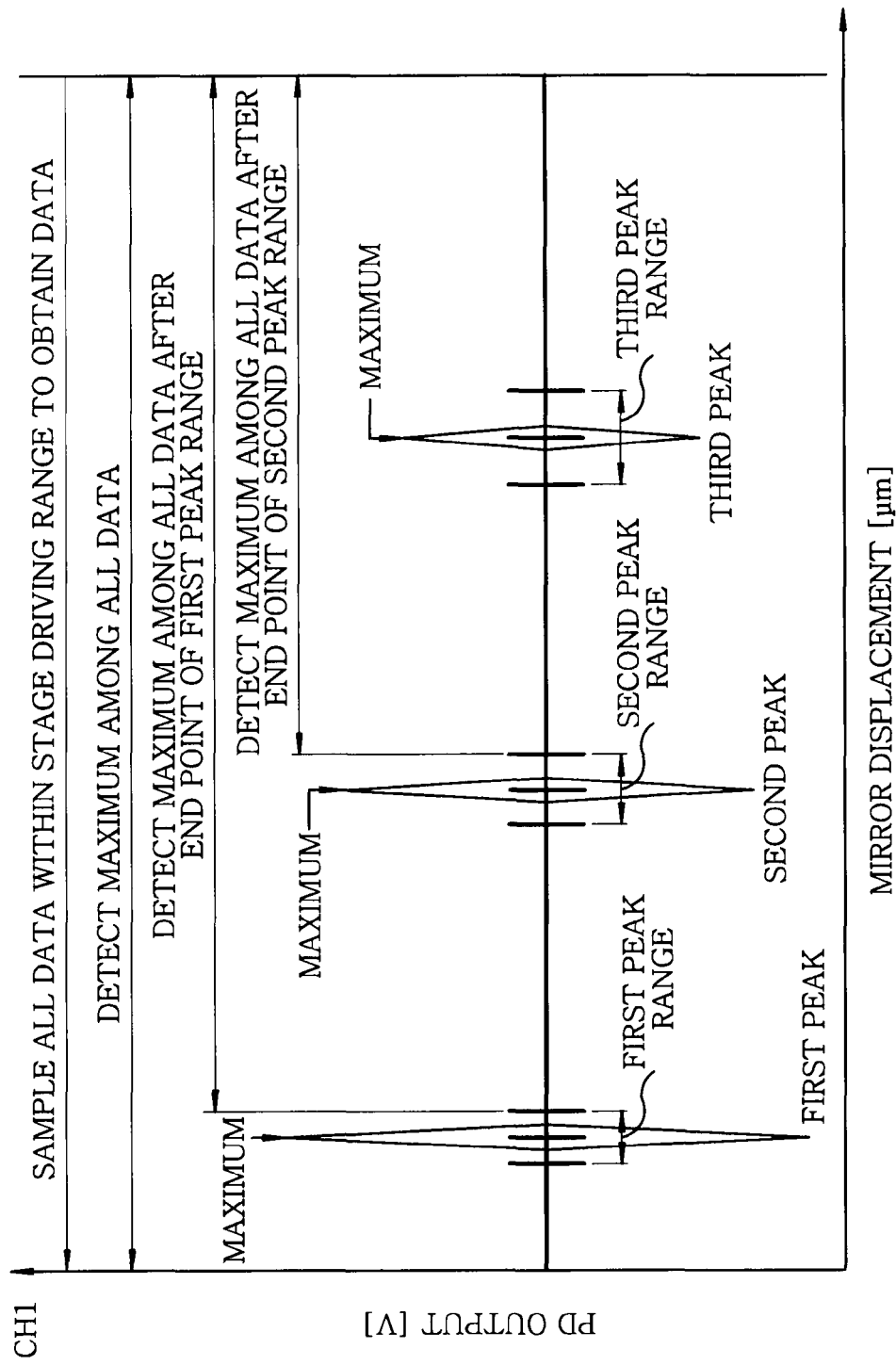
FIG. 11 is a view for explaining a method of detecting an initial peak position.
Figures 12A, 12B, 12C, 12D:
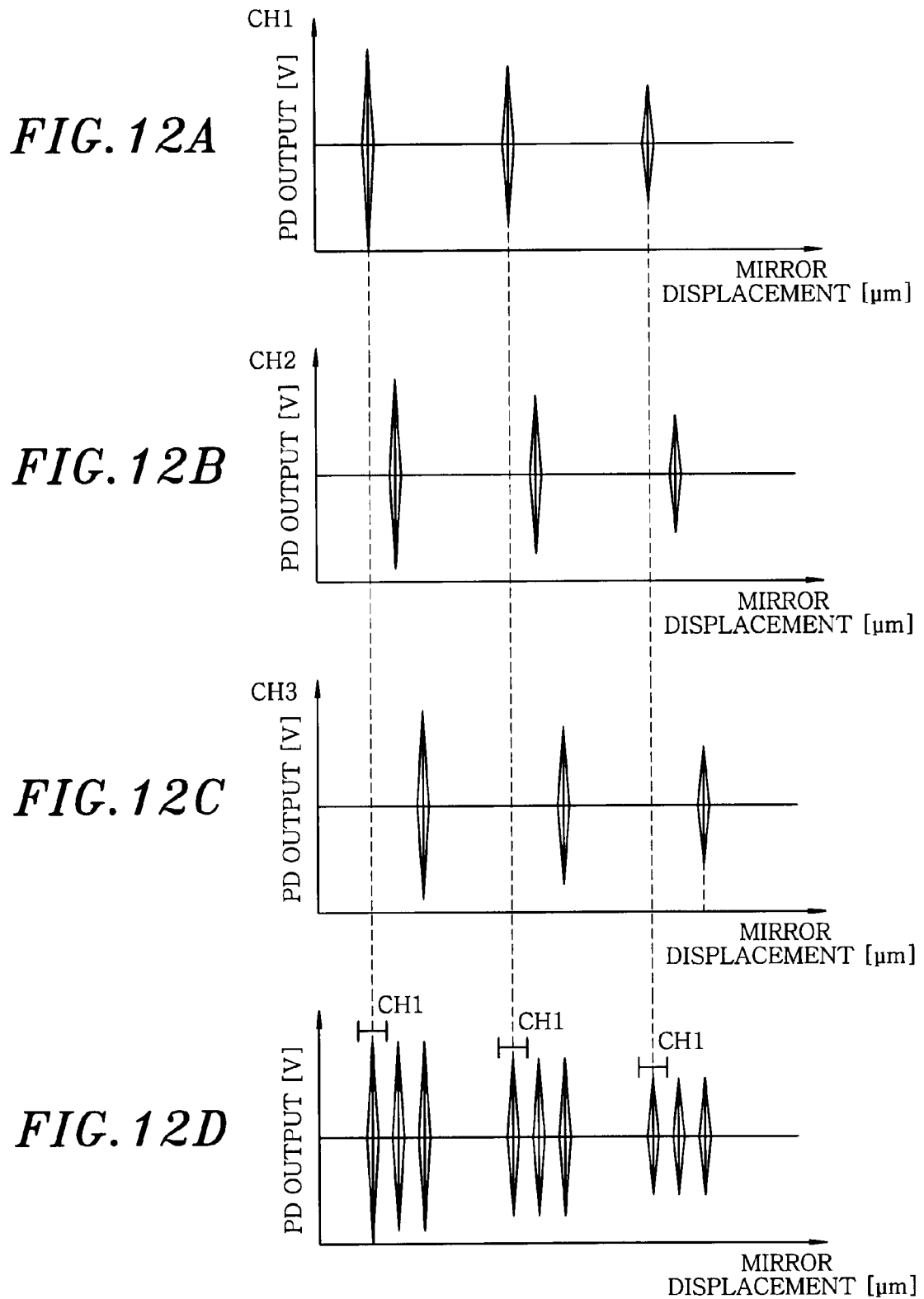
FIGS. 12A to 12D are views for explaining a method of detecting an initial peak position.

FIG. 11 shows an example of a measured waveform obtained for one measurement point (channel) as described above. Herein, the Y-axis represents an output level of a photodetector, and the X-axis represents a displacement of a mirror functioning as a reference beam reflector.

In the above-discussed method for an initial peak position detection, the sampling of data is performed from the time when the linear stage 151 is located at one limit position (a location that minimizes the optical path length of the reference beam) such as a counter-motor side limit in FIG. 1 until the displacement of the linear stage 151 covers the total driving range. Therefore, it is possible to execute a peak position detection even when the thickness of the temperature measurement object 10 is unknown.

Regarding a first peak, the controller 170 detects a maximum output level among the entire data, and determines that the first peak is located at the peak center of a first peak range extending between the maximum output position±a certain width (μm). Regarding a second peak, the controller 170 detects a maximum output level among all the data that follows the end point of the first peak range, and determines that the second peak is located at a peak center of a second peak range extending between the second maximum output position±a certain width (μm). Further, regarding a third peak, the controller 170 detects a maximum value among all the data that follows the end point of the second peak range, and determines that the third peak is located at a peak center of a third peak range extending between the third maximum value±a certain width (μm). The detection of the peak center is performed by acquiring a center position of a squared waveform whose amplitude is equal to the square of that of the original waveform.

FIGS. 12A to 12D show exemplary waveform data obtained for the measurement points CH1 to CH3 as described above. Herein, the Y-axis represents an output level of the photodetector, and the X-axis represents a displacement of a mirror functioning as the reference beam reflector. As shown therein, the controller 170 adjusts an optical path length to prevent the peak positions from overlapping each other, thereby making it possible to identify a peak from each measurement point (especially refer to FIG. 12D).

After detecting the initial peak position in this manner, an initial thickness measurement of the temperature measurement object is performed before measuring the temperature. The temperature of the temperature measurement object is detected by a change in thickness of the temperature measurement object with respect to the initial thickness.

Figure 13A:
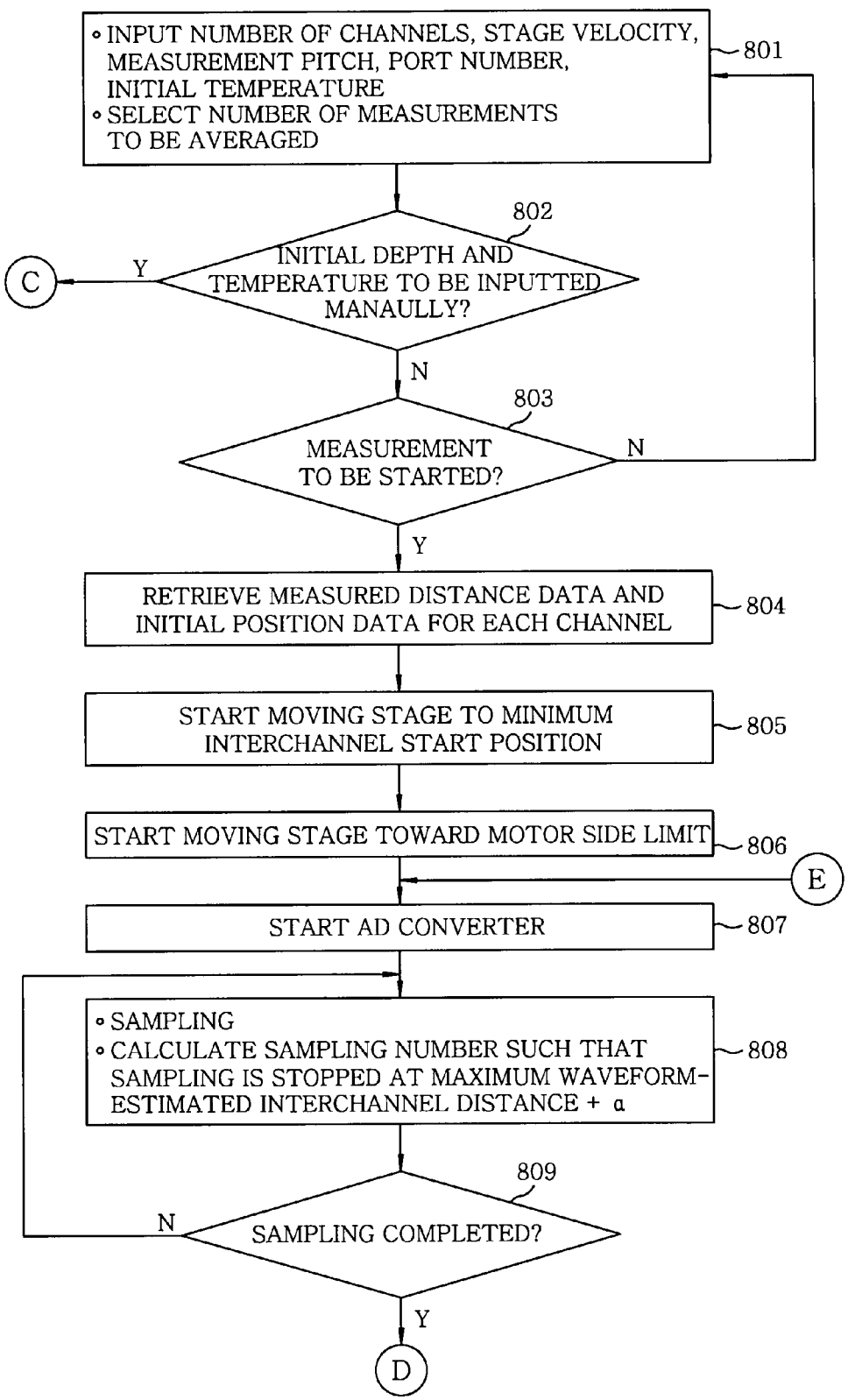
FIGS. 13A and 13B present a flow chart for explaining a method of detecting an initial thickness.
Figure 13B:
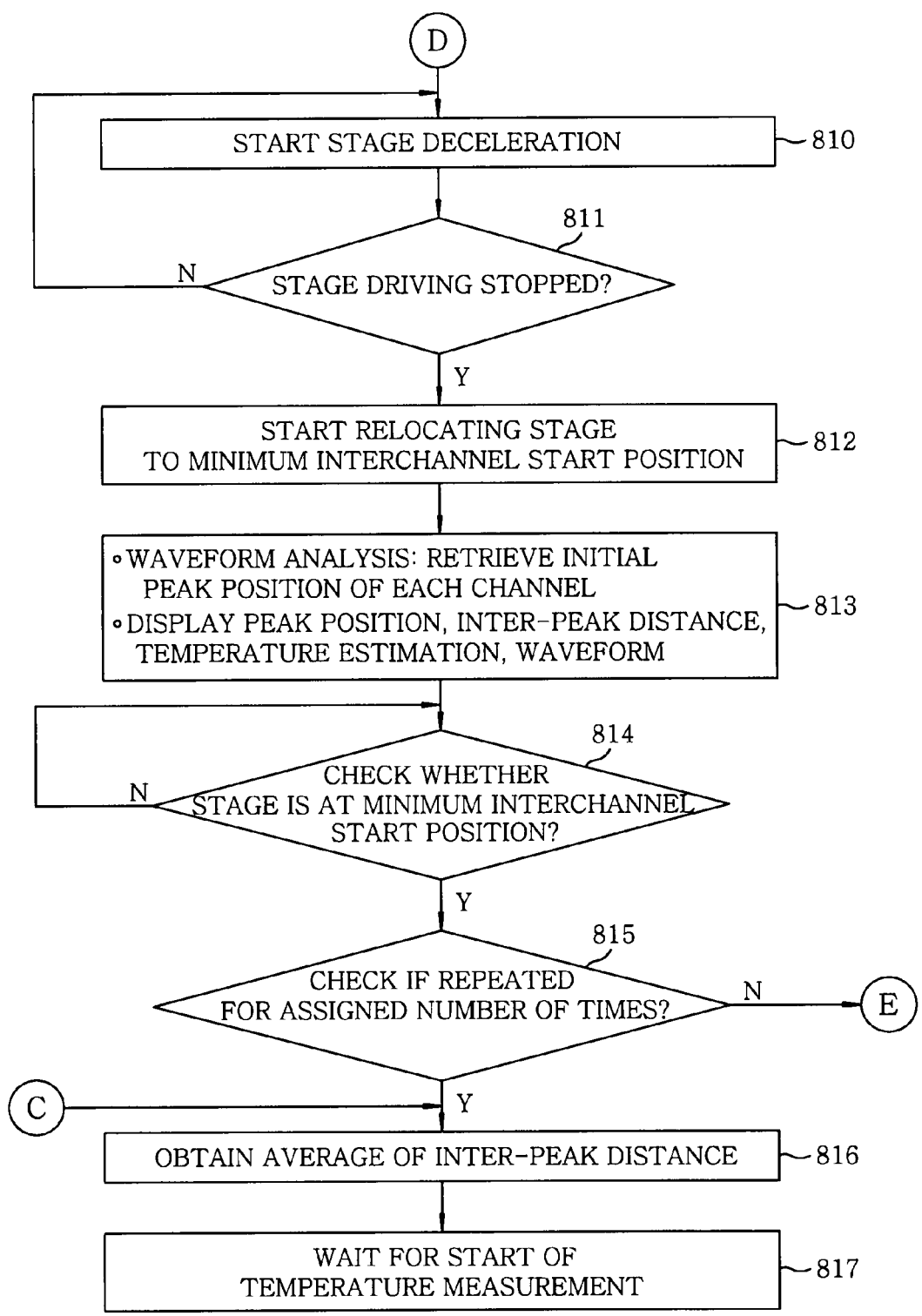

The initial thickness measurement will be described with reference to FIGS. 13A and 13B. First, the number of channels, a stage velocity, a measurement pitch, a port number and an initial temperature are inputted. Then, it is selected how many number of measurements are to be averaged (step 801).

Next, the user determines whether the initial thickness and temperature are to be inputted manually (step 802). If the user already knows the initial thickness and temperature, and is to input them manually, step 816 is performed, which will be described later. However, if the initial thickness and temperature are not to be inputted manually, the measurement is started (YES in step 803); and the initial position data and the measurement distance data are retrieved for each of the measurement points (channels) (step 804).

Thereafter, the linear stage 151 is started to be moved to a minimum interchannel start position (step 805). When the linear stage 151 arrives at the minimum interchannel start position, it is started to move the linear stage 151 toward a motor side limit (step 806).

Further, the A/D converter 172 is started (step 807) to thereby perform the sampling (step 808). At this time, the number of samplings is calculated such that the sampling is stopped at a maximum waveform-estimated interchannel distance+α.

When the sampling is completed (YES in step 809), the velocity of the linear stage 151 is reduced (step 810) to thereby stop the driving of the linear stage 151 (YES in step 811).

Subsequently, it is started that the linear stage 151 is moved to an minimum interchannel start position (step 812).

Further, the initial peak position is retrieved for each measurement channel to perform the waveform analysis, and displays the peak position, the inter-peak distance, temperature estimation and waveform (step 813).

Next, it is determined whether the linear stage 151 has reached the minimum interchannel start position (step 814), and then whether the measurement has been repeated for a given number of times (step 815). After repeatedly performing the measurement for the given number of times, an average of inter-peak distance is obtained (step 816), and then the procedure enters a state of waiting for a temperature measurement (step 817).

Otherwise, if the initial thickness and temperature are already known, they are manually inputted (step 802). Then, an average of inter-peak distance is obtained (step 816), and then the procedure enters the state of waiting for a temperature measurement (step 817).

As a result, it is possible to detect the initial peak position and measure the temperature after the initial thickness measurement. The temperature measurement will now be described with reference to FIGS. 14A and 14B.

In this example, the temperature measurement is prepared in a state where the settings of the initial thickness measurement are maintained (step 901). Then, a location to store data, the number of measurements and a peak proximity range are inputted (step 902).

When the input is completed, the measurement is started (YES in step 903), and the linear stage 151 is started to be moved to the minimum interchannel start position (step 904). When the linear stage 151 arrives at the minimum interchannel start position, the linear stage 151 is started to be moved toward the motor side limit (step 905).

Subsequently, the A/D converter is started (step 906) to thereby perform the sampling (step 907). At this time, the number of sampling is calculated such that the sampling is stopped at a maximum waveform-estimated interchannel distance+α.

When the sampling is completed (YES in step 908), the velocity of the linear stage 151 is reduced (step 909) to thereby stop the driving of the linear stage 151 (step 910).

Thereafter, the linear stage 151 is started to be moved to an minimum interchannel start position (step 911).

Thereafter, the waveform analysis is performed, the inter-peak distance is calculated from the peak positions, the temperature is estimated from the inter-peak distance, the waveform is shown, and the measurement data is stored (step 912).

Next, it is determined whether the linear stage 151 arrives at the minimum interchannel start position (step 913), and then whether the measurement has been repeated for a given number of times (step 914). After repeatedly performing the measurement for the given number of times, the measurement is finished (step 915).

Figure 15B:
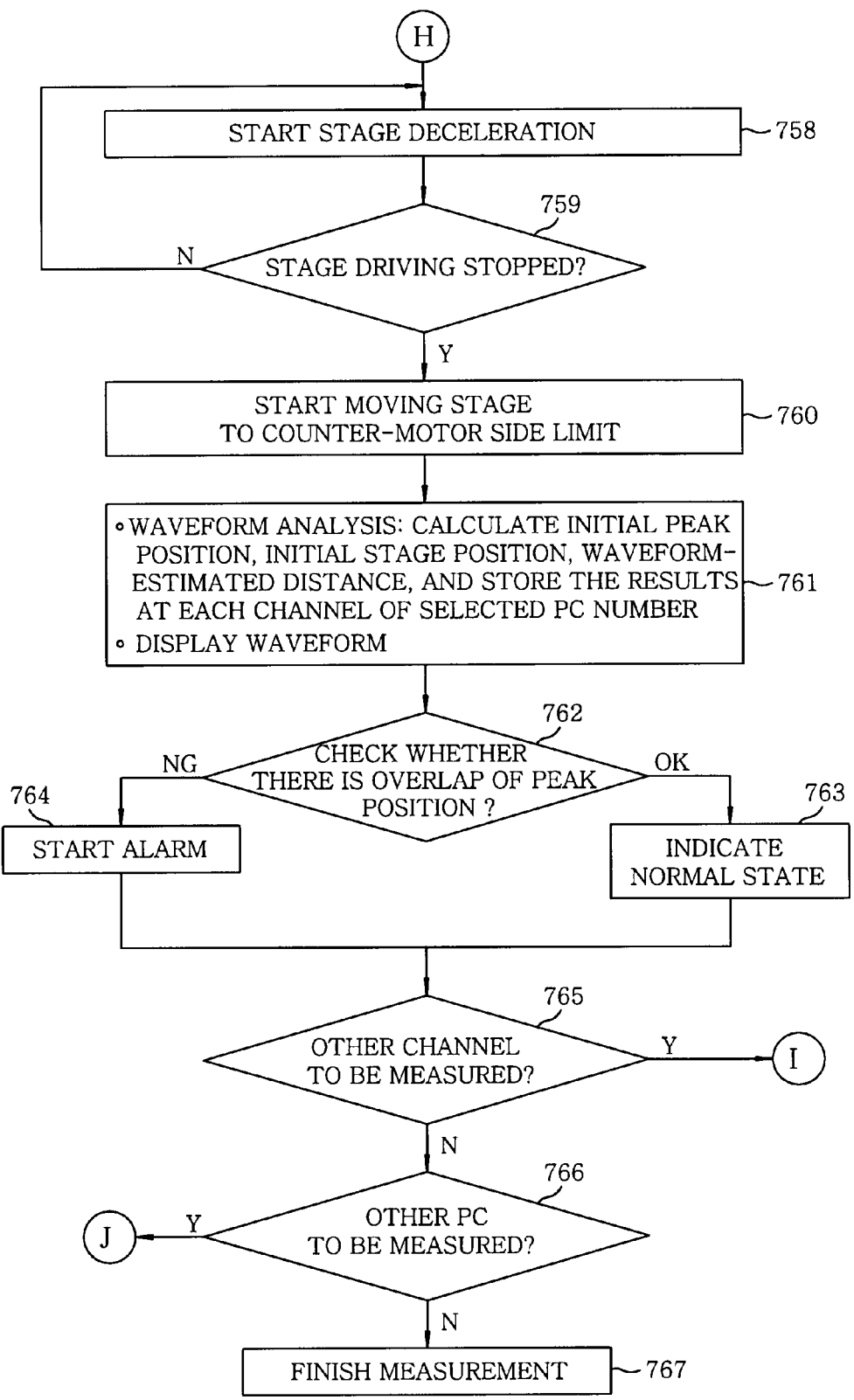

Hereinafter, the temperature measurement apparatuses 400 and 500 shown in FIGS. 5 and 6 that can measure the temperature in the plurality of process chambers will be described. FIGS. 15A and 15B describe a method of detecting an initial peak position under the control of the controller 170.

First, a process chamber (PC) number is selected (step 750). Then, the following steps 751 to 765 are performed. Steps 751 to 765 are substantially the same as steps 701 to 715 in FIGS. 10A and 10B, except that, in step 761, data including an initial peak position and the like are stored for each of the measurement channels corresponding to the selected PC number.

Thereafter, at the end of the procedure, it is determined whether other process chamber is to be measured (step 766); and, if there is no other process chamber to be measured, the measurement is finished (step 767).

Figure 16A:
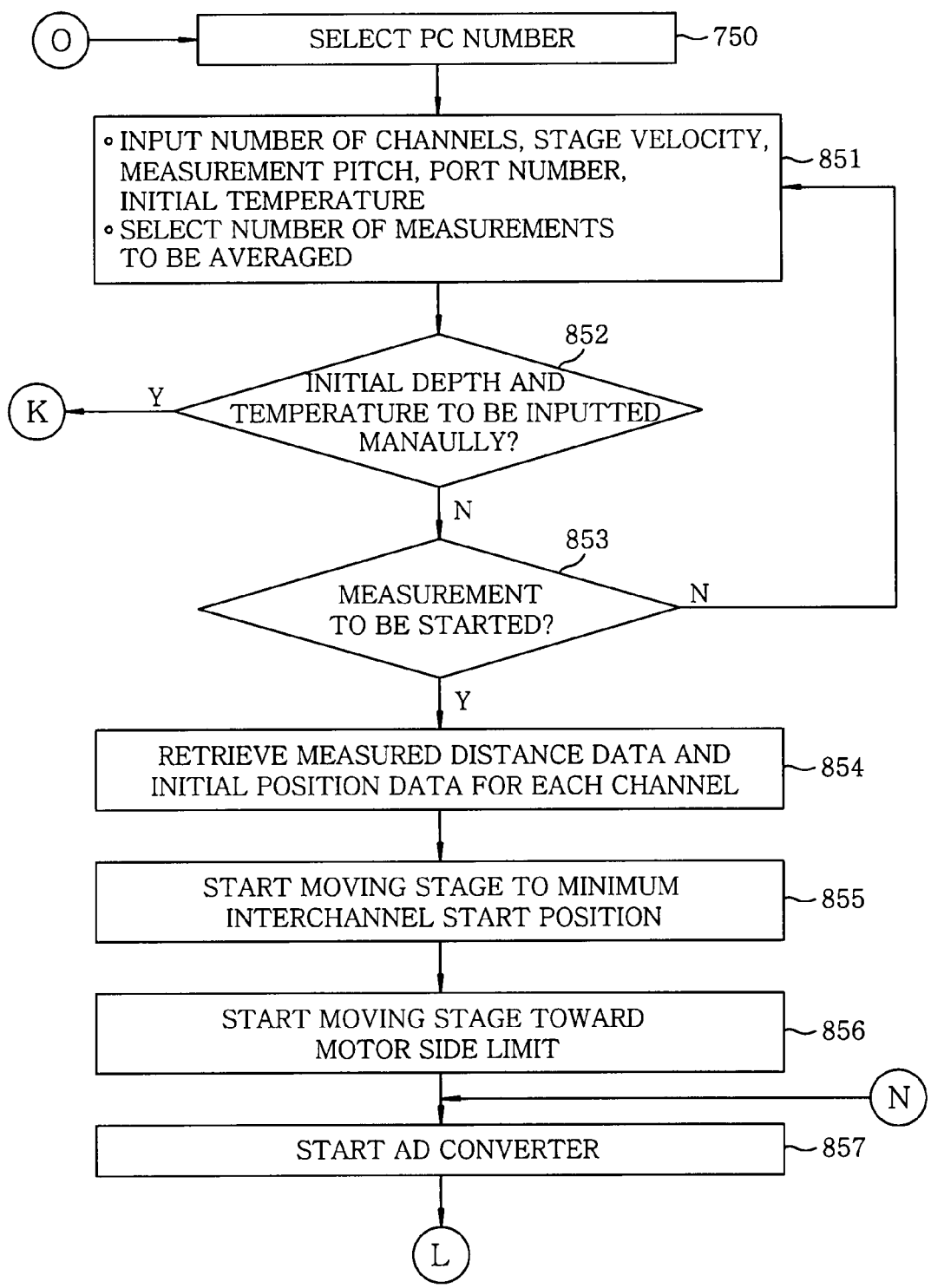
FIGS. 16A to 16C present a flow chart for explaining a method of detecting an initial thickness in a plurality of process chambers.
Figure 16B:
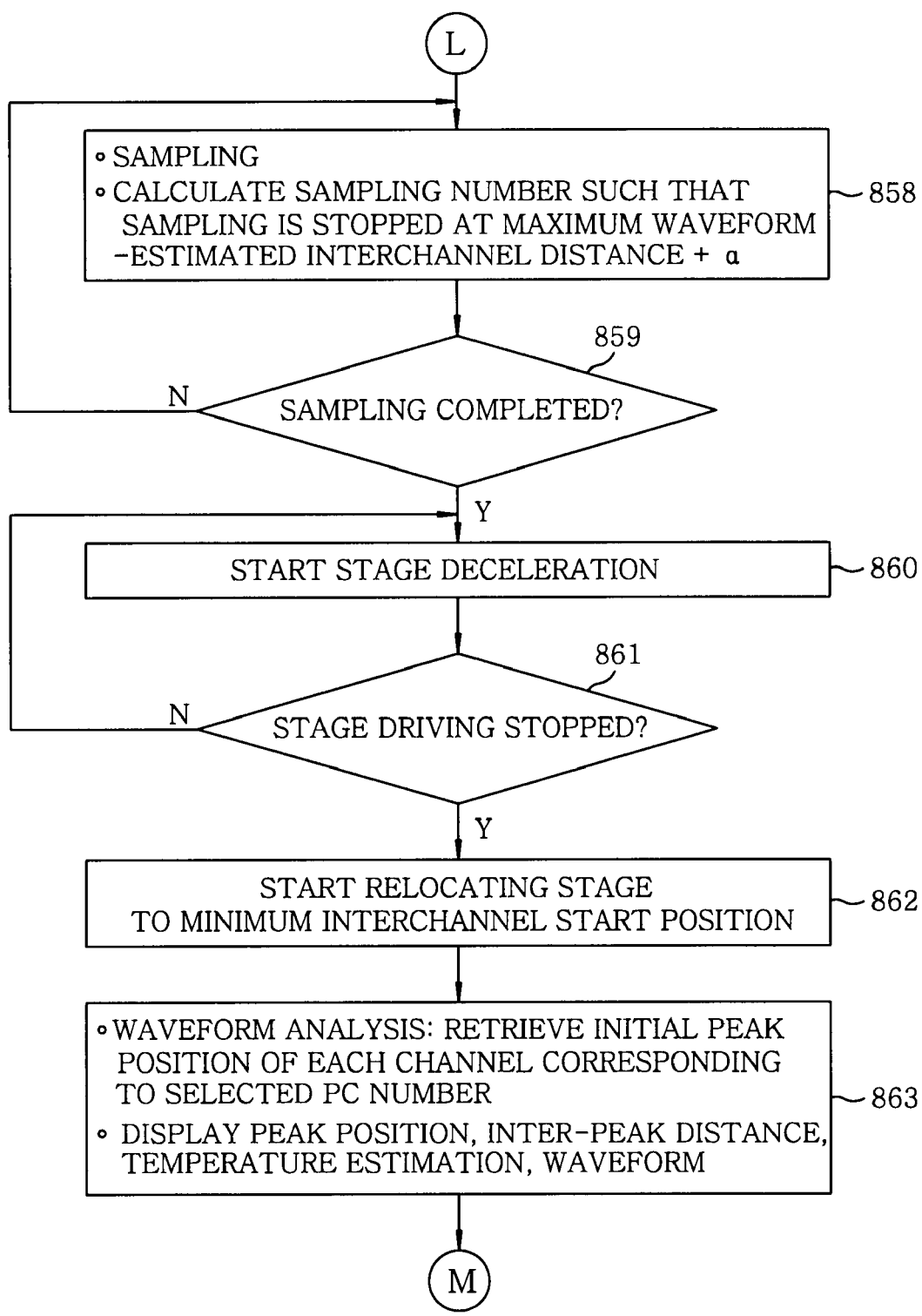
Figure 16C:
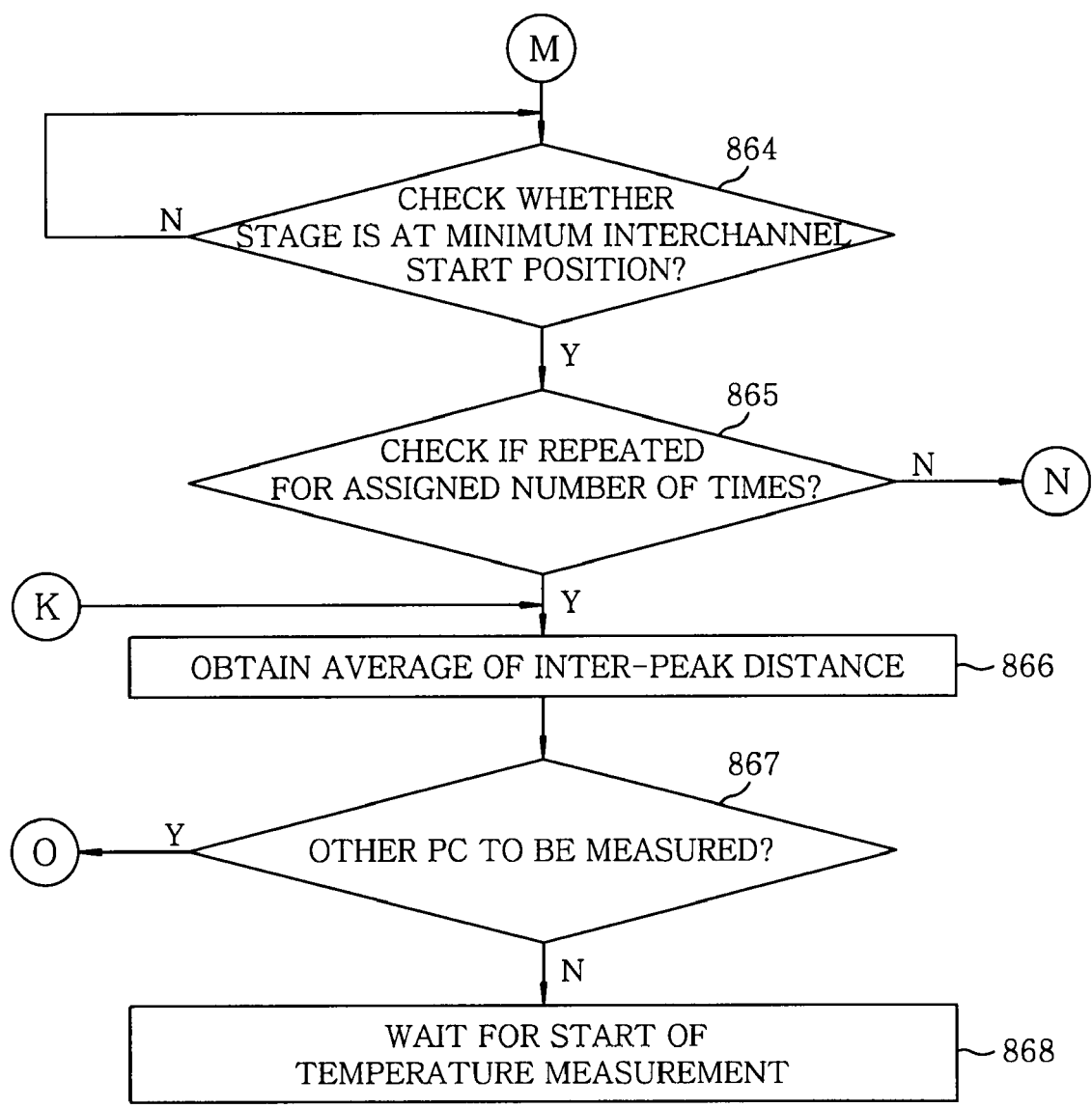

FIGS. 16A to 16C explain a method of measuring an initial thickness under the control of the controller 170 in accordance with the temperature measurement apparatuses 400 and 500 capable of measuring temperatures in the plurality of process chambers.

First, the PC number is selected (step 850). Then, the following steps 851 to 866 are performed. Steps 851 to 866 are substantially the same as steps 801 to 816 in FIGS. 13A and 13B except the following: in step 854, initial position data of each measurement channel corresponding to the selected PC number are retrieved; and, in step 863, initial position data of each measurement channel corresponding to the selected PC number are retrieved. At the end of the procedure, it is determined whether other process chamber is to be measured (step 867); and, if there is no other process chamber to be measured, the procedure enters a state of waiting for the temperature measurement (step 868).

Figure 14A:
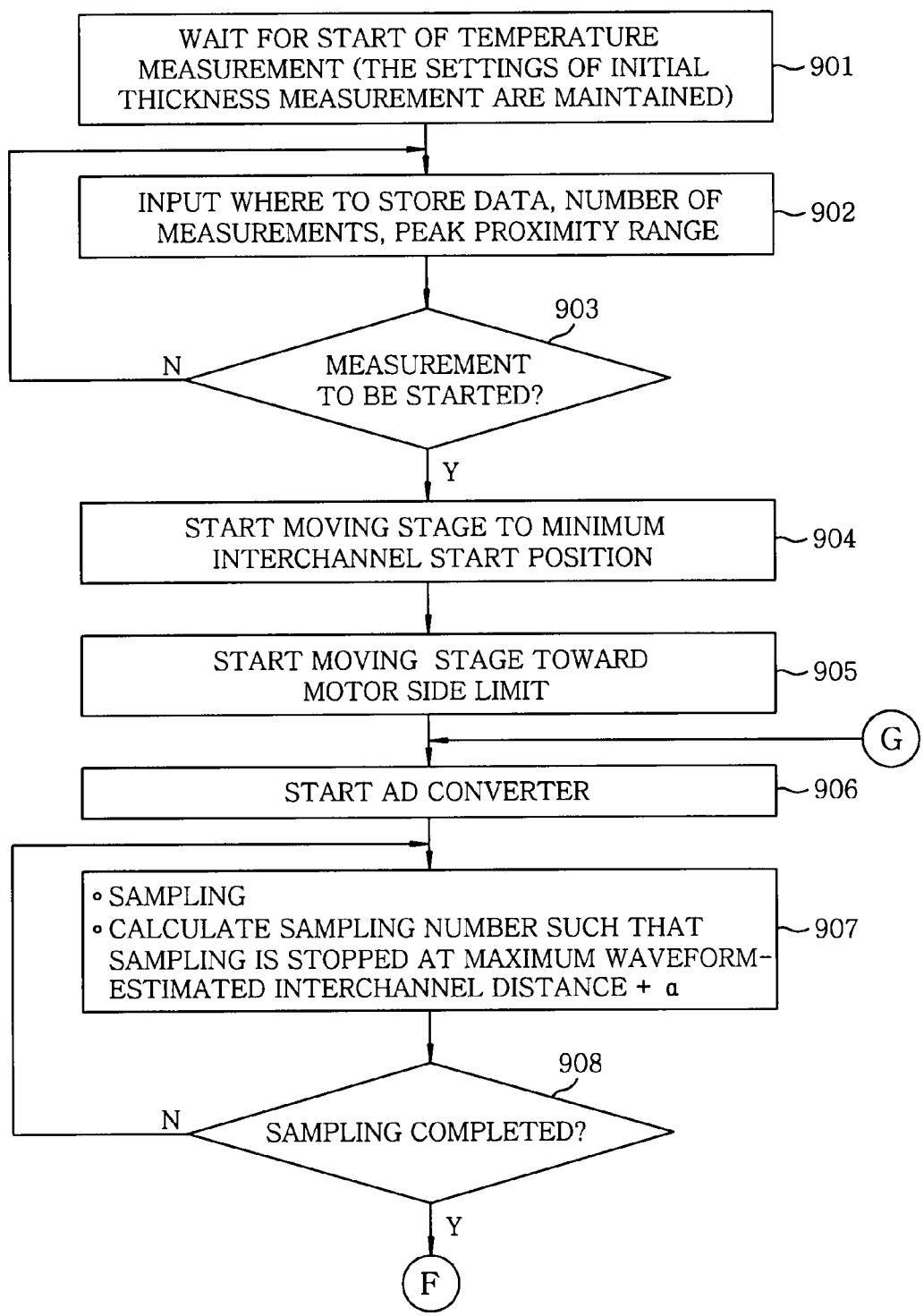
FIGS. 14A and 14B present a flow chart for explaining a method of detecting a temperature.
Figure 14B:
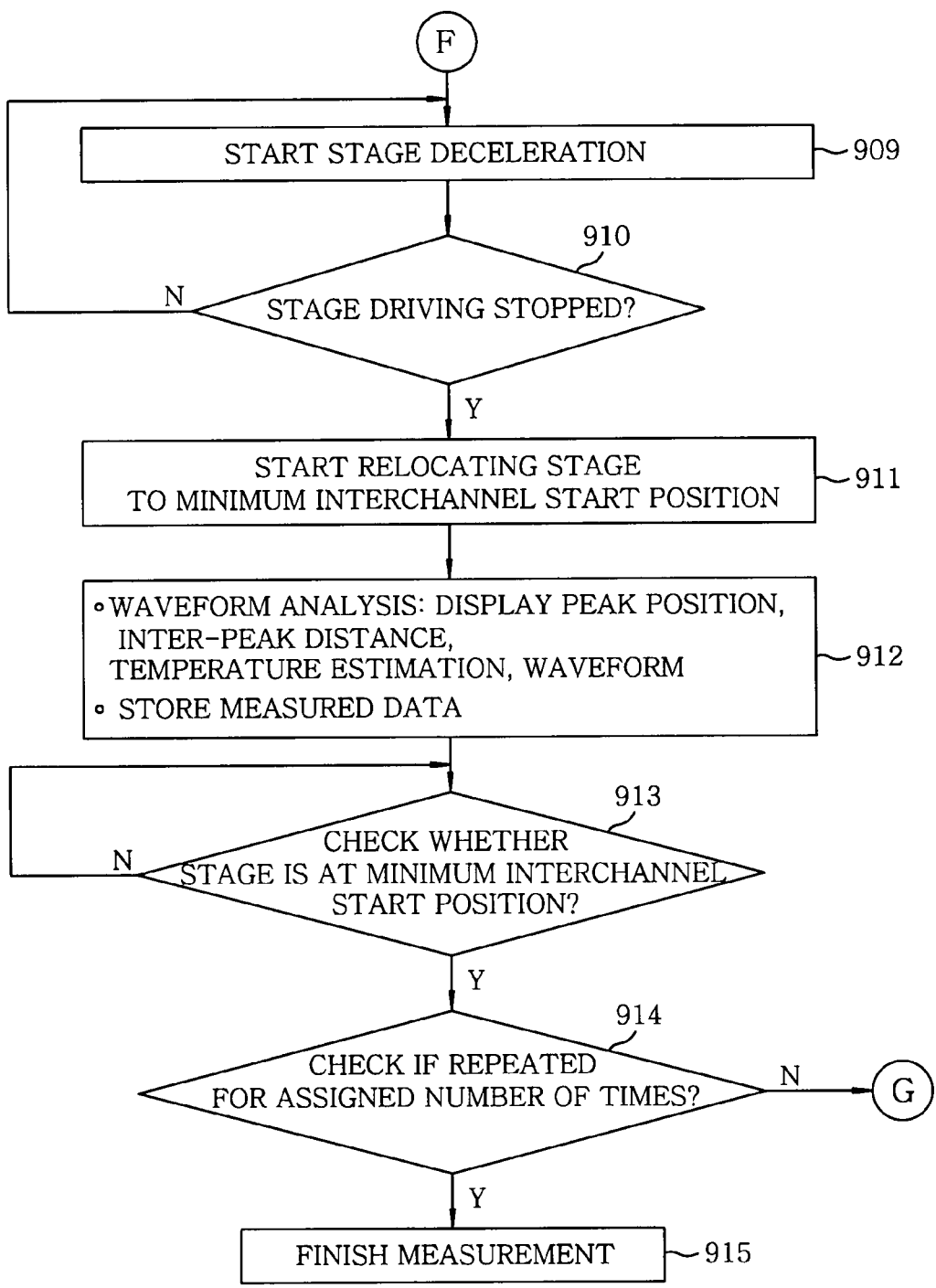

In the temperature measurement apparatuses 400 and 500 for measuring temperatures in a plurality of process chambers, the temperature measurement processes after the state of waiting for the temperature measurement (step 868) in FIG. 16C is substantially the same as those shown in FIGS. 14A and 14B of the above.

In the temperature measurement apparatuses 100 and so on, the light beam generated from the light source 110 enters the first splitter 120, which divides it into a measurement beam and a reference beam. Among these, the measurement beam is divided into first to nth measuring beams by the second splitter 130 to be irradiated onto the temperature measurement object 10 such as a semiconductor wafer at each measurement point, thereby being reflected by a front surface, an interface surface or a rear surface of each layer.

Meanwhile, the reference beam is reflected by the reference beam reflector 140. Then, the reflected beams of the first to nth measuring beams enter the first splitter 120 by way of the second splitters 130, thereby being detected by the photodetector 160 together with the reflected beam of the reference beam.

Further, by scanning the reference beam reflector 140, it is possible to obtain interference waveforms shown in FIGS. 12A to 12D, in which the Y-axis represents the output level of the photodetector 160 and the X-axis represents the displacement of the reference beam reflector 140. Herein, the low coherence light source as described above is used as the light source 110. Since the coherence length of the light emanated therefrom is short, a strong interference occurs at such locations where the optical path length of the measurement beam is equivalent to that of the reference beam, and interference hardly occurs at the other locations.

For this reason, by moving the reference beam reflector 140 to vary the optical path length of the reference beam, the reflected reference beam interferes with the reflected measurement beam reflected from a front and a rear surface of the temperature measurement object 10, and, if inner layers exist therein, from each of the inner layers due to a difference in refractive index.

In the examples shown in FIGS. 12A to 12D, as the reference beam reflector 140 is scanned, the following sequence is observed. First, an interference wave is generated by the interference between a reflected reference beam and a reflected beam from one surface (a front or rear surface) at the measurement point P1 in the temperature measurement object 10. Then, another interference wave is generated by the interference between a reflected reference beam and a reflected beam from one surface (a front or rear surface) at the measurement point P2 in the temperature measurement object 10. Thereafter, another interference wave is generated by the interference between a reflected reference beam and a reflected beam from one surface (a front or rear surface) at the measurement point P3 in the temperature measurement object 10.

As the scanning of the reference beam reflector 140 is further continued, an interference wave is generated by the interference between the reflected reference beam and the reflected beam from an interface surface of an inner layer at each of the measurement points P1, P2 and P3. Finally, an interference wave is generated by the interference between the reflected reference beam and the reflected beam from the other surface (a rear or front surface) at each of the measurement points P1, P2 and P3. In this manner, simply by scanning the reference beam reflector 140 one time, interference waves from different measurement points can be measured at the same time.

Hereinafter, an explanation will be given on a method of measuring the temperature based on the interference wave induced by the interference between the measurement beam and the reference beam. Methods of measuring the temperature based on the interference wave include, for example, a temperature conversion method using a change in the optical path length caused by a temperature change. In the following, a temperature conversion method using a position shift of the interference waveform will be explained.

When the temperature measurement object 10 such as a semiconductor wafer is heated by a heater or the like, the temperature measurement object 10 expands, so that its refractive index is changed. Therefore, the position of the interference waveform is shifted, and the interval between peaks in the interference waveform is changed after the temperature change. In this case, if there occurs a temperature change in each of the measurement points, the position of the interference waveform is shifted at each measurement point, thereby changing the interval between peaks in the interference waveform.

Therefore, by measuring the interval between the peaks in the interference waveform for each measurement point, a temperature change having occurred at each of the measurement points can be detected. In case of, for example, the temperature measuring apparatus 100 shown in FIG. 1, the interval between the peaks in the interference waveform depends on the moving distance of the reference beam reflector 140 (e.g., a reference mirror). Therefore, by measuring the displacement made by the reference mirror, which corresponds to the interval between the peaks of the interference waveform, a temperature change can be detected.

If the thickness of the temperature measurement object 10 is d, and its refractive index is n, a shift of peak position in the interference waveform depends on a linear expansion coefficient $\alpha$ of each layer in relation to the thickness d, and also depends on a temperature coefficient $\beta$ of refractive index change of each layer in relation to a change in the refractive index n. Further, it is known that the temperature coefficient β of refractive index change depends on the wavelength.

Therefore, the thickness d' of the wafer after a temperature change at a certain measurement point P is represented as the following equation Eq. (1). Herein, ΔT represents a temperature change at a measurement point, α represents a linear expansion rate, and β represents a temperature coefficient of refractive index change. Further, d and n represent a thickness and a refractive index at the measurement point P before the temperature change, respectively.

$$d'=d(1+\alpha\Delta T), n'=n(1+\beta\Delta T) \qquad \text{Eq. (1)}$$

As can be seen from Eq. (1), the optical path length of the measurement beam passing through the measurement point P is changed by a change in temperature. In general, the optical path length is defined by a product of the thickness d and the refractive index n. Therefore, if the optical path length of the measurement beam passing through the measurement point P before the temperature change is L, and the optical path length after the temperature is changed by ΔT at the measurement point is L', L and L' are represented as the following equation Eq. (2).

$$L=d\cdot n, L'=d'\cdot n' \qquad \text{Eq. (2)}$$

Accordingly, a difference L–L' between the optical path length of the measurement beam before the temperature change and that after temperature change at the measurement point can be calculation by Eqs. (1) and (2). Thus calculated result is summarized by the following equation Eq. (3), where minor terms are omitted in consideration of α·β<<α and α·β<<β.

$$L' - L = d'\cdot n' - d\cdot n = d\cdot n\cdot(\alpha+\beta)\cdot\Delta T \qquad \text{Eq. (3)}$$
$$= L\cdot(\alpha+\beta)\cdot\Delta T1$$

In the above, the optical path length of the measurement beam for each measurement point corresponds to a width between peaks of the interference waveform induced by the measuring beam and the reference beam. Therefore, if a linear expansion rate α and a temperature coefficient β of refractive index change are known in advance, the optical path length can be converted into the temperature of each measurement point using Eq. (3) by measuring the width between the peaks of the interference waveform at each measurement point.

As described above, if the temperature is converted from the interference wave, the optical path length determined by the inter-peak width of the interference waveform varies according to the linear expansion rate α and the temperature coefficient β of refractive index change, the linear expansion rate α and the temperature coefficient β of refractive index change needs to be acquired in advance.

In a certain temperature range, the linear expansion rate α and the temperature coefficient β of refractive index change of a specified material (e.g., a semiconductor wafer) may vary with the temperature as well. For example, within a temperature range from about 0 to 100° C., the linear expansion rate α does not normally change significantly. Therefore, the linear expansion rate can be regarded as a constant in this range. However, if the temperature exceeds 100° C., the linear expansion rates of some materials start to change by greater extents as the temperature becomes higher. Therefore, in some cases, the temperature dependency of the linear expansion rate cannot be neglected. Similarly, there are also cases where the temperature dependency of the temperature coefficient β of refractive index change cannot be neglected.

In the case of, for example, silicon (Si) that forms a semiconductor wafer, it is known that the linear expansion rate α and the temperature coefficient β of refractive index change can be approximated with quadratic curves within a temperature range from 0 to 500° C. Since the linear expansion rate α and the temperature coefficient β of refractive index change have a temperature dependency of the above, the accuracy in the temperature conversion can be enhanced by, for example, acquiring in advance the linear expansion rate α and the temperature coefficient β of refractive index change as functions of temperature and taking thus acquired data into consideration.

Further, the temperature measurement method using the interference wave induced by the measurement beam and the reference beam is not limited to the method of the above. It is also possible to, for example, use a change in absorption intensity due to temperature change. Further, it is also possible to combine the method using a change in the optical path length change due to temperature change and the method of using a change in absorption intensity due to temperature change.

While the invention has been shown and described with respect to the embodiments, it will be understood by those skilled in the art that various changes and modifications may be made without departing from the scope of the invention as defined in the following claims.

What is claimed is:

1. A temperature measuring apparatus comprising:
   a light source;
   a first splitter for dividing a light beam emanated from the light source into a measurement beam and a split reference beam;
   at least one second splitter for dividing the measurement beam coming from the first splitter into a first to an nth measuring beam;
   a reference beam reflector for reflecting the reference beam coming from the first splitter to provide a reflected reference beam;
   an optical path length adjuster for adjusting an optical path length of the reflected reference beam reflected from the reference beam reflector;
   a reference beam transmitting member for transmitting the split reference beam coming from the first splitter to a reference beam irradiation position from which the split reference beam is irradiated onto the reference beam reflector;
   a first to an nth measuring beam transmitting member for transmitting the first to the nth measuring beam coming from the second splitters to measuring beam irradiating positions from which the measurement beams are irradiated onto a first to an nth measurement points of a temperature measurement object;
   a photodetector for measuring an interference between the reflected reference beam reflected from the reference beam reflector and the first to the nth measuring beam reflected from the temperature measurement object, wherein the optical path lengths of the first to the nth measuring beam from the second splitter to the temperature measurement object are different from each other; and
   an attenuator that attenuates the split reference beam coming from the first splitter and the reflected reference beam reflected from the reference beam reflector such that an intensity of the attenuated reflected reference beam becomes closer to an intensity of the measurement beam reflected from the temperature measurement object, wherein the attenuator attenuates the split and the reflected reference beam passing therethrough to $1/\sqrt{n}$ of an original intensity thereof.

2. The temperature measuring apparatus of claim 1, wherein the temperature measurement object is a substrate to be processed by a substrate processing apparatus, and the first to the nth measuring beam transmitting member are arranged in the substrate processing apparatus such that the first to the nth measuring beam are irradiated onto a plurality of measurement points in a surface of the substrate.

3. The temperature measuring apparatus of claim 1, wherein the temperature measurement object is a substrate to be processed by a substrate processing apparatus including a plurality of process chambers in each of which a process is performed on the substrate,
wherein the first to the nth measuring beam transmitting member are arranged in each of the process chambers such that the first to the nth measuring beam are irradiated onto a plurality of measurement points in a surface of the substrate, and a plurality of the second splitters are respectively provided for the process chambers,
wherein the temperature measuring apparatus further comprises a selector provided between the first splitter and the second splitters for selecting one of the second splitters to be used, and
wherein the temperature measuring apparatus is capable of measuring a temperature of the substrate in the process.

4. The temperature measuring apparatus of claim 1, wherein the temperature measurement object is a substrate to be processed by a substrate processing apparatus including a plurality of process chambers in each of which a process is performed on the substrate,
wherein the first to the nth measuring beam transmitting member are arranged in each of the process chambers such that the first to the nth measuring beam are irradiated onto a plurality of measurement points in a surface of the substrate, and a plurality of the second splitters are respectively provided for the process chambers,
wherein the temperature measuring apparatus further comprises a third splitter provided between the first splitter and the second splitters, which divides the measurement beam coming from the first splitter into divided beams to thereby output the divided beams to the second splitters, respectively, and
wherein the temperature measuring apparatus is capable of measuring a temperature of the substrate in the process.

5. A temperature measuring method, comprising:
irradiating a first to an nth measuring beam whose optical path lengths are different from each other onto respective measurement points of a temperature measurement object while irradiating a reference beam onto a reference beam reflector;
attenuating the reference beam reflected from the reference beam reflector such that an intensity thereof becomes closer to a total intensity of the first to the nth measuring beam by using an attenuator;
measuring interferences between the attenuated reference beam reflected from the reference beam reflector and the first and the nth measuring beam reflected from the temperature measurement object while moving the reference beam reflector in one direction to thereby change an optical path length of the reference beam reflected from the reference beam reflector; and
measuring temperatures at the respective measurement points of the temperature measurement object based on the results of measuring the interferences, wherein
the attenuator attenuates the reference beam passing therethrough to $1/\sqrt{n}$ of an original intensity thereof.

\* \* \* \* \*